(12) United States Patent
Nam

(10) Patent No.: US 11,852,062 B2
(45) Date of Patent: Dec. 26, 2023

(54) APPARATUS FOR REDUCING GREENHOUSE GAS EMISSION IN VESSEL AND VESSEL INCLUDING THE SAME

(71) Applicant: DAEWOO SHIPBUILDING & MARINE ENGINEERING CO., LTD., Geoje-si (KR)

(72) Inventor: Byung Tak Nam, Geoje-si (KR)

(73) Assignee: DAEWOO SHIPBUILDING & MARINE ENGINEERING CO., LTD., Geoje-si (KR)

( * ) Notice: Subject to any disclaimer, the term of this patent is extended or adjusted under 35 U.S.C. 154(b) by 0 days.

(21) Appl. No.: 18/031,351

(22) PCT Filed: Dec. 17, 2020

(86) PCT No.: PCT/KR2020/018601
§ 371 (c)(1),
(2) Date: Apr. 12, 2023

(87) PCT Pub. No.: WO2022/080588
PCT Pub. Date: Apr. 21, 2022

(65) Prior Publication Data
US 2023/0383678 A1    Nov. 30, 2023

(30) Foreign Application Priority Data

Oct. 13, 2020  (KR) .................... 10-2020-0132175
Oct. 13, 2020  (KR) .................... 10-2020-0132181

(51) Int. Cl.
*F01N 3/04* (2006.01)
*F01N 3/08* (2006.01)
*F01N 3/20* (2006.01)

(52) U.S. Cl.
CPC ............. *F01N 3/04* (2013.01); *F01N 3/0857* (2013.01); *F01N 2570/10* (2013.01); *F01N 2570/18* (2013.01)

(58) Field of Classification Search
CPC ........ F01N 3/04; F01N 3/0857; F01N 3/2066; F01N 3/208; F01N 3/085; F01N 3/0842;
(Continued)

(56) References Cited

U.S. PATENT DOCUMENTS 7,220,882 B2 *  5/2007  Porro .................... C07C 273/04
                                                      564/72
10,668,428 B2 *  6/2020  Weng .................... B01D 53/18
(Continued)

FOREIGN PATENT DOCUMENTS

JP      2019-510628 A      4/2019
KR      10-1201426 B1      11/2012
(Continued)

OTHER PUBLICATIONS

International Search Report in International Application No. PCT/KR2020/018601, dated Jul. 9, 2021, 2 pages.

*Primary Examiner* — Shafiq Mian
*Assistant Examiner* — Dapinder Singh
(74) *Attorney, Agent, or Firm* — Park, Kim & Suh, LLC

(57) ABSTRACT

The present invention relates to an apparatus for reducing greenhouse gas emission in a vessel and a vessel including the same, which are capable of constantly maintaining a concentration of a greenhouse gas absorbing liquid to prevent a decrease in absorption performance of an absorption tower, and applying a pressurization system to prevent the loss of an absorbent liquid due to the natural evaporation of a high-concentration absorbent liquid. Or which are capable of cooling exhaust gas with fresh water by a heat exchange method, thereby preventing a decrease in concentration of an (Continued)

absorbent liquid, and controlling the concentration of the absorbent liquid to constantly maintain the concentration of the absorbing liquid, thereby preventing a decrease in absorption performance.

20 Claims, 16 Drawing Sheets

(58) Field of Classification Search
CPC ............... F01N 13/009; F01N 2570/10; F01N 2570/18; F01N 2570/04; F01N 2570/14; F01N 2610/02; F01N 2610/1453; F01N 2260/024; F01N 2560/021; F01N 2240/25; F01N 2560/022; F01N 2590/022; Y02T 10/12; Y02T 10/40; Y02A 50/20

See application file for complete search history.

(56) References Cited

U.S. PATENT DOCUMENTS

| | | | |
|---|---|---|---|
| 11,123,686 B2 * | 9/2021 | Henson | B01D 53/1475 |
| 11,179,670 B2 * | 11/2021 | Weng | B01D 53/18 |
| 2004/0265199 A1 * | 12/2004 | MacKnight | B01D 53/1412 |
| | | | 423/220 |
| 2008/0112869 A1 * | 5/2008 | MacKnight | B01D 53/0454 |
| | | | 95/218 |
| 2013/0287673 A1 | 10/2013 | Wang et al. | |

FOREIGN PATENT DOCUMENTS

| | | |
|---|---|---|
| KR | 10-2013-0047470 A | 5/2013 |
| KR | 10-2016-0079801 A | 7/2016 |
| KR | 10-2018-0006059 A | 1/2018 |
| KR | 10-2018-0086566 A | 8/2018 |
| KR | 10-1973108 B1 | 4/2019 |
| KR | 10-2019-0113486 A | 10/2019 |
| KR | 10-2031210 A | 10/2019 |
| KR | 10-2020-0084288 A | 7/2020 |
| KR | 10-2020-0114027 A | 10/2020 |

* cited by examiner (a)

(b)

(a)

(b)

(a)

(b)

APPARATUS FOR REDUCING GREENHOUSE GAS EMISSION IN VESSEL AND VESSEL INCLUDING THE SAME

CROSS-REFERENCE TO RELATED APPLICATIONS

This application is a National Phase Application of PCT International Application No. PCT/KR2020/018601, which was filed on Dec. 17, 2020, and which claims priority from Korean Patent Application No. 10-2020-0132175 filed on Oct. 13, 2020, and Korean Patent Application No. 10-2020-0132181 filed on Oct. 13, 2020. The disclosures of the above patent applications are incorporated herein by reference in their entirety.

TECHNICAL FIELD

The present invention relates to an apparatus for reducing greenhouse gas emission in a vessel and a vessel including the same, which are capable of constantly maintaining a concentration of a greenhouse gas absorbing liquid to prevent a decrease in absorption performance of an absorption tower, and applying a pressurization system to prevent the loss of an absorbent liquid due to the natural evaporation of a high-concentration absorbent liquid.

In addition, the present invention relates to an apparatus for reducing greenhouse gas emission in a vessel and a vessel including the same, which are capable of cooling exhaust gas with fresh water by a heat exchange method, thereby preventing a decrease in concentration of an absorbent liquid, and controlling the concentration of the absorbent liquid to constantly maintain the concentration of the absorbing liquid, thereby preventing a decrease in absorption performance.

BACKGROUND ART

Recently, global warming and related environmental disasters have occurred due to the influence of greenhouse gas emission caused by indiscriminate use of fossil fuels.

In this regard, a series of technologies related to capture and storage of carbon dioxide, which is the representative greenhouse gas, without carbon dioxide emission are called carbon dioxide capture and storage (CCS) technologies. In recent years, CCS technologies have attracted much attention. Among CCS technologies, chemical absorption is the most commercialized technology in terms of enabling large-scale treatment.

In addition, carbon dioxide emission is regulated through the IMO's EEDI. The IMO is targeting a reduction of 50% or more in emissions by 2050 compared to 2008 and a reduction of 40% in emissions by 2030 compared to 2008. Therefore, technologies that do not emit $CO_2$ or capture emitted $CO_2$ are attracting attention.

For reference, among the carbon dioxide capture and storage (CCS) technologies for directly capturing and storing carbon dioxide, a $CO_2$ capture technology may be approached in various ways according to $CO_2$ generation conditions of target processes. Current representative technologies are an absorption method, an adsorption method, and a membrane separation method. Among them, the wet absorption method has high technological maturity in onshore plants and may easily process $CO_2$ in large quantities. Therefore, the wet absorption method may be said to be the closest capture technology to commercialization of CCS technology. As an absorbent agent, amines and ammonia are mainly used.

On the other hand, the above-described technologies for reducing carbon dioxide emission or capturing generated carbon dioxide are not currently commercialized in vessels, and methods of using hydrogen or ammonia as fuel are currently under development and have not reached the level of commercialization.

In addition, the need is raised to apply, to vessels using low sulphur oil or LNG so as to emit a small amount of $SO_x$ or prevent $SO_x$ emission, a technology for absorbing $CO_2$, which is one of exhaust gases emitted from a vessel engine, converting $CO_2$ into materials that do not affect environments, discharging the materials, or converting the materials into useful materials and storing the useful materials, and preventing the decrease in absorption performance due to the change in concentration of absorbent liquid.

Furthermore, the need is raised to apply, to vessels using low sulphur oil or LNG so as to emit a small amount of $SO_x$ or prevent $SO_x$ emission, a technology for absorbing $CO_2$, which is one of exhaust gases emitted from a vessel engine, converting $CO_2$ into materials that do not affect environments, discharging the materials, or converting the materials into useful materials and storing the useful materials, preventing the decrease in concentration of absorbent liquid due to cooling of exhaust gas by fresh water, and preventing the decrease in absorption performance due to concentration change caused by repeated circulation of absorbent liquid.

DISCLOSURE

Technical Problem

An object of the present invention is to provide an apparatus for reducing greenhouse gas emission in a vessel and a vessel including the same, which are capable of maintaining the concentration of greenhouse gas absorbing liquid constant to prevent the decrease in absorption performance of an absorption tower, and applying a pressurization system to prevent the loss of absorbent liquid due to the natural evaporation of high-concentration absorbent liquid.

In addition, an object of the present invention is to provide an apparatus for reducing greenhouse gas emission in a vessel and a vessel including the same, which are capable of preventing the decrease in concentration of absorbent liquid due to cooling of exhaust gas by fresh water, and preventing the decrease in absorption performance due to concentration change caused by the repeated circulation of absorbent liquid.

Technical Solution

In order to achieve the above object, the present invention provides an apparatus for reducing greenhouse gas emission in a vessel, the apparatus including: a seawater supply unit that supplies seawater; an absorbent liquid producing unit that produces and supplies a high-concentration $CO_2$ absorbent liquid; an absorption tower including a $CO_2$ removing unit that cools exhaust gas discharged from a vessel engine by reacting the exhaust gas with the seawater supplied from the seawater supply unit and removes $CO_2$ by reacting the cooled exhaust gas with the absorbent liquid supplied from the absorbent liquid producing unit to convert $CO_2$ into an aqueous ammonium salt solution; an absorbent liquid concentration unit that adjusts a concentration of the absorbent liquid supplied from the absorbent liquid producing unit to the absorption tower; and an ammonia recycling unit that recycles $NH_3$ by reacting the aqueous ammonium salt solution discharged from the absorption tower with an aqueous divalent metal hydroxide solution and returns the $NH_3$ back to the absorption tower for reuse as the absorbent liquid.

In addition, the vessel engine may use liquefied natural gas (LNG) or low sulphur marine gas oil (LSMGO) as fuel.

In addition, when the vessel engine uses the LSMGO as fuel, the absorption tower may further include a $SO_x$ absorbing unit that dissolves and removes $SO_x$ while cooling the exhaust gas discharged from the vessel engine by reacting the exhaust gas with the seawater supplied from the seawater supply unit, and the $CO_2$ removing unit may cool the exhaust gas, from which the $SO_x$ has been removed, by reacting the exhaust gas with the seawater supplied from the seawater supply unit and remove $CO_2$ by reacting the cooled exhaust gas with the absorbent liquid supplied from the absorbent liquid producing unit to convert $CO_2$ into the aqueous ammonium salt solution.

In addition, the absorption tower may further include a $NO_x$ absorbing unit that absorbs and removes $NO_x$ from the exhaust gas emitted from the vessel engine, and the $CO_2$ removing unit may cool the exhaust gas, from which the $NO_x$ has been removed, by reacting the exhaust gas with the seawater supplied from the seawater supply unit and remove $CO_2$ by reacting the cooled exhaust gas with the absorbent liquid supplied from the absorbent liquid producing unit to convert $CO_2$ into the aqueous ammonium salt solution.

In addition, in the absorption tower, a $NO_x$ absorbing unit that absorbs and removes $NO_x$ from the exhaust gas discharged from the vessel engine, a $SO_x$ absorbing unit that dissolves and removes $SO_x$ while cooling the exhaust gas, from which the $NO_x$ has been removed, through reaction with the seawater supplied from the seawater supply unit, and the $CO_2$ removing unit that removes $CO_2$ by reacting the exhaust gas, from which the $SO_x$ has been removed, with the absorbent liquid supplied from the absorbent liquid producing unit to convert $CO_2$ into the aqueous ammonium salt solution may be sequentially stacked.

In addition, the ammonia recycling unit may recycle $NH_3$ and return the $NH_3$ back to the absorption tower for reuse as the absorbent liquid, and the $NO_x$ absorbing unit may absorb $NO_x$ with the $NH_3$ supplied from the ammonia recycling unit, or absorb $NO_x$ using urea water.

In addition, the seawater supply unit may include: a seawater pump that receives seawater from the outside of the vessel through a sea chest and pumps the seawater to the $SO_x$ absorbing unit; and a seawater control valve that controls a spray amount of the seawater supplied from the seawater pump to the $SO_x$ absorbing unit according to an amount of the exhaust gas.

In addition, the absorbent liquid producing unit may include: a fresh water tank that stores fresh water; a fresh water control valve that supplies the fresh water from the fresh water tank; a $NH_3$ storage that stores high-pressure $NH_3$; an ammonia water tank that produces and stores high-concentration ammonia water by spraying the $NH_3$ supplied from the $NH_3$ storage to the fresh water supplied by the fresh water control valve; a pH sensor that measures a concentration of the ammonia water in the ammonia water tank; and an ammonia water supply pump that supplies the ammonia water from the ammonia water tank to the absorbent liquid concentration adjusting unit.

In addition, the absorbent liquid concentration adjusting unit may include: a fresh water supply line that supplies fresh water; a pH sensor that measures a concentration of ammonia water which is the absorbent liquid supplied to the absorption tower; a flow rate control valve that controls a flow rate of the ammonia water supplied from the absorbent liquid producing unit; a mixer that adjusts the concentration of the ammonia water by increasing the concentration by mixing the high-concentration ammonia water from the absorbent liquid producing unit or reducing the concentration by mixing the fresh water from the fresh water supply line according to the concentration of the ammonia water measured by the pH sensor; and a pressure maintenance valve that prevents evaporation of $NH_3$ when the mixer performs the mixing.

In addition, the $SO_x$ absorbing unit may include: a multi-stage seawater spray nozzle that sprays the seawater supplied from the seawater supply unit downward; and a partition wall-shaped exhaust gas inlet pipe that prevents cleaning water from flowing back, or an umbrella-shaped blocking plate that covers the exhaust gas inlet pipe.

In addition, porous upper plates having a passage through which the exhaust gas passes may be respectively formed in multi-stages under the seawater spray nozzle, so that the seawater and the exhaust gas come into contact with each other.

In addition, an absorption apparatus filled with a packing material for allowing the seawater and the exhaust gas to come into contact with each other may be formed under the seawater spray nozzle, so that the seawater dissolves $SO_x$.

In addition, the $CO_2$ removing unit may include: an ammonia water spray nozzle that sprays the ammonia water supplied from the absorbent liquid concentration adjusting unit downward; a packing material that contacts $CO_2$ with the ammonia water to convert the $CO_2$ into $NH_4HCO_3(aq)$; a cooling jacket that is formed in multi-stages for each section of an absorption apparatus filled with the packing material and cools heat generated by a $CO_2$ absorption reaction; a water spray that collects $NH_3$ discharged to the outside without reacting with $CO_2$; a mist removal plate that is formed in a curved multi-plate shape and returns the ammonia water toward the packing material; a partition wall that is formed so that the ammonia water does not flow backward; and an umbrella-shaped blocking plate that covers an exhaust gas inlet hole surrounded by the partition wall.

In addition, the packing material may include multi-stage distilling column packings designed to increase a contact area per unit volume, and a solution redistributor may be formed between the multi-stage distilling column packings.

In addition, the absorption tower may further include an exhaust gas economizer (EGE) that is formed between the $NO_x$ absorbing unit and the $SO_x$ absorbing unit and performs heat exchange between waste heat of the vessel engine and boiler water.

In addition, the ammonia recycling unit may include: a storage tank that stores the aqueous divalent metal hydroxide solution; a mixing tank in which the aqueous divalent metal hydroxide solution and the aqueous ammonium salt solution discharged from the absorption tower are stirred by an agitator to generate $NH_3(g)$ and carbonate; a filter that suctions a solution and precipitate from the mixing tank and separates carbonate; a high-pressure pump that transfers the solution and precipitate to the filter at high pressure; and an ammonia water storage tank that stores ammonia water or fresh water separated by the filter and supplies the ammonia water or the fresh water to the absorbent liquid concentration adjusting unit.

In addition, the aqueous divalent metal hydroxide solution stored in the storage tank may be $Ca(OH)_2$ or $Mg(OH)_2$ produced by reacting the fresh water with CaO or MgO.

In addition, the apparatus may further include a discharge unit including: a cleaning water tank that stores cleaning water discharged from the absorption tower; a water treatment device including a filtering unit that controls turbidity to satisfy an outboard discharge condition of the cleaning water transferred to the cleaning water tank by a transfer pump, and a neutralizing agent injecting unit that controls pH; and a sludge storage tank that separates and stores solid emissions.

On the other hand, the present invention may provide a vessel including the above-described apparatus.

In order to achieve another object, the present invention provides an apparatus for reducing greenhouse gas emission in a vessel, the apparatus including: an exhaust gas cooling unit that cools exhaust gas discharged from a vessel engine; an absorbent liquid producing unit that produces and supplies a high-concentration $CO_2$ absorbent liquid; an absorption tower including a $CO_2$ removing unit that removes $CO_2$ by reacting the exhaust gas cooled by the exhaust gas cooling unit with the absorbent liquid supplied from the absorbent liquid producing unit to convert $CO_2$ into an aqueous ammonium salt solution; an absorbent liquid concentration adjusting unit that adjusts a concentration of the absorbent liquid supplied from the absorbent liquid producing unit to the absorption tower; and an ammonia recycling unit that recycles $NH_3$ by reacting the aqueous ammonium salt solution discharged from the absorption tower with an aqueous divalent metal hydroxide solution and returns the $NH_3$ back to the absorption tower for reuse as the absorbent liquid.

In addition, the vessel engine may use liquefied natural gas (LNG) or low sulphur marine gas oil (LSMGO) as fuel.

In addition, the exhaust gas cooling unit may cool the exhaust gas to a temperature of 27° C. to 33° C. by circulating fresh water supplied from an onboard cooling system through a heat exchange pipe surrounding an exhaust gas discharge pipe.

In addition, the absorption tower may further include a $NO_x$ absorbing unit that absorbs and removes $NO_x$ from the exhaust gas emitted from the vessel engine, and the $CO_2$ removing unit may remove $CO_2$ by reacting the exhaust gas, from which the $NO_x$ has been removed and which is cooled by the exhaust gas cooling unit, with the absorbent liquid supplied from the absorbent liquid producing unit to convert $CO_2$ into the aqueous ammonium salt solution.

In addition, The ammonia recycling unit may recycle $NH_3$ and return the $NH_3$ back to the absorption tower for reuse as the absorbent liquid, and the $NO_x$ absorbing unit may absorb $NO_x$ with the $NH_3$ supplied from the ammonia recycling unit, or may absorb $NO_x$ using urea water.

In addition, the absorbent liquid producing unit may include: a fresh water tank that stores fresh water; a fresh water control valve that supplies the fresh water from the fresh water tank; a $NH_3$ storage that stores high-pressure $NH_3$; an ammonia water tank that produces and stores high-concentration ammonia water by spraying the $NH_3$ supplied from the $NH_3$ storage to the fresh water supplied by the fresh water control valve; a pH sensor that measures a concentration of the ammonia water in the ammonia water tank; and an ammonia water supply pump that supplies the ammonia water from the ammonia water tank to the absorbent liquid concentration adjusting unit.

In addition, compressed air of a certain pressure may be injected into the ammonia water tank to prevent evaporation loss of $NH_3$.

In addition, the absorbent liquid concentration adjusting unit may include: a fresh water supply line that supplies fresh water; a pH sensor that measures a concentration of ammonia water which is the absorbent liquid supplied to the absorption tower; a flow rate control valve that controls a flow rate of the ammonia water supplied from the absorbent liquid producing unit; a mixer that adjusts the concentration of the ammonia water by increasing the concentration by mixing the high-concentration ammonia water from the absorbent liquid producing unit or reducing the concentration by mixing the fresh water from the fresh water supply line according to the concentration of the ammonia water measured by the pH sensor; and a pressure maintenance valve that prevents evaporation of $NH_3$ when the mixer performs the mixing.

In addition, the $CO_2$ removing unit may include: an ammonia water spray nozzle that sprays the ammonia water supplied from the absorbent liquid concentration adjusting unit downward; a packing material that contacts $CO_2$ with the ammonia water to convert the $CO_2$ into $NH_4HCO_3(aq)$; a cooling jacket that is formed in multi-stages for each section of an absorption apparatus filled with the packing material and cools heat generated by a $CO_2$ absorption reaction; a water spray that collects $NH_3$ discharged to the outside without reacting with $CO_2$; a mist removal plate that is formed in a curved multi-plate shape and returns the ammonia water toward the packing material; a partition wall that is formed so that the ammonia water does not flow backward; and an umbrella-shaped blocking plate that covers an exhaust gas inlet hole surrounded by the partition wall.

In addition, the packing material may include multi-stage distilling column packings designed to increase a contact area per unit volume, and a solution redistributor may be formed between the multi-stage distilling column packings.

In addition, the absorption tower may further include an exhaust gas economizer (EGE) that is formed between the $NO_x$ absorbing unit and the exhaust gas cooling unit and performs heat exchange between waste heat of the vessel engine and boiler water.

In addition, the ammonia recycling unit may include: a storage tank that stores the aqueous divalent metal hydroxide solution; a mixing tank in which the aqueous divalent metal hydroxide solution and the aqueous ammonium salt solution discharged from the absorption tower are stirred by an agitator to generate $NH_3(g)$ and carbonate; a filter that suctions a solution and precipitate from the mixing tank and separates carbonate; a high-pressure pump that transfers the solution and precipitate to the filter at high pressure; and an ammonia water storage tank that stores ammonia water or fresh water separated by the filter and supplies the ammonia water or the fresh water to the absorbent liquid concentration adjusting unit.

In addition, the aqueous divalent metal hydroxide solution stored in the storage tank may be $Ca(OH)_2$ or $Mg(OH)_2$ produced by reacting the fresh water with CaO or MgO.

In addition, the apparatus may further include a discharge unit including: a cleaning water tank that stores cleaning water discharged from the absorption tower; a water treatment device including a filtering unit that controls turbidity to satisfy an outboard discharge condition of the cleaning water transferred to the cleaning water tank by a transfer pump, and a neutralizing agent injecting unit that controls pH; and a sludge storage tank that separates and stores solid emissions.

On the other hand, the present invention may provide a vessel including the above-described apparatus.

Advantageous Effects

The present invention has the following effects. A concentration of a greenhouse gas absorbing liquid may be constantly maintained to prevent a decrease in absorption performance of an absorption tower. A pressurization system may be applied to prevent the loss of an absorbent liquid due to the natural evaporation of a high-concentration absorbent liquid. In order to satisfy the IMO greenhouse gas emission regulations, greenhouse gas may be converted into materials that do not affect environments and then separately discharged or may be converted into useful materials and then stored. $NH_3$ may be recycled to minimize consumption of relatively expensive $NH_3$. The capacity size of the rear end of a filter may be reduced. Greenhouse gas may be stored in the form of carbonate that exists in a natural state so that greenhouse gas may be discharged to the sea. Side reactions caused by $SO_x$ remaining during $NH_3$ recycling may be removed, thereby minimizing the loss of $NH_3$ and preventing impurities from being included when recovering ammonia.

In addition, the present invention has the following effects. Exhaust gas may be cooled with fresh water supplied from an onboard cooling system by a heat exchange method, thereby preventing a decrease in concentration of an absorbent liquid and reducing the capacity size of the rear end of the filter. A concentration of an absorbent liquid may be controlled to constantly maintain the concentration of the absorbing liquid to prevent a decrease in greenhouse gas absorption performance. A pressurization system may be applied to prevent the loss of an absorbent liquid due to the natural evaporation of a high-concentration absorbent liquid. In order to satisfy the IMO greenhouse gas emission regulations, greenhouse gas may be converted into materials that do not affect environments and then separately discharged or may be converted into useful materials and then stored. Greenhouse gas may be stored in the form of carbonate that exists in a natural state so that greenhouse gas may be discharged to the sea. $NH_3$ may be recycled to minimize the consumption of relatively expensive $NH_3$.

BEST MODE

Hereinafter, embodiments of the present invention will be described in detail with reference to the accompanying drawings so that the present invention can be easily carried out by those of ordinary skill in the art. The present invention may be embodied in many different forms and is not limited to embodiments of the present invention described herein.

Figure 1:
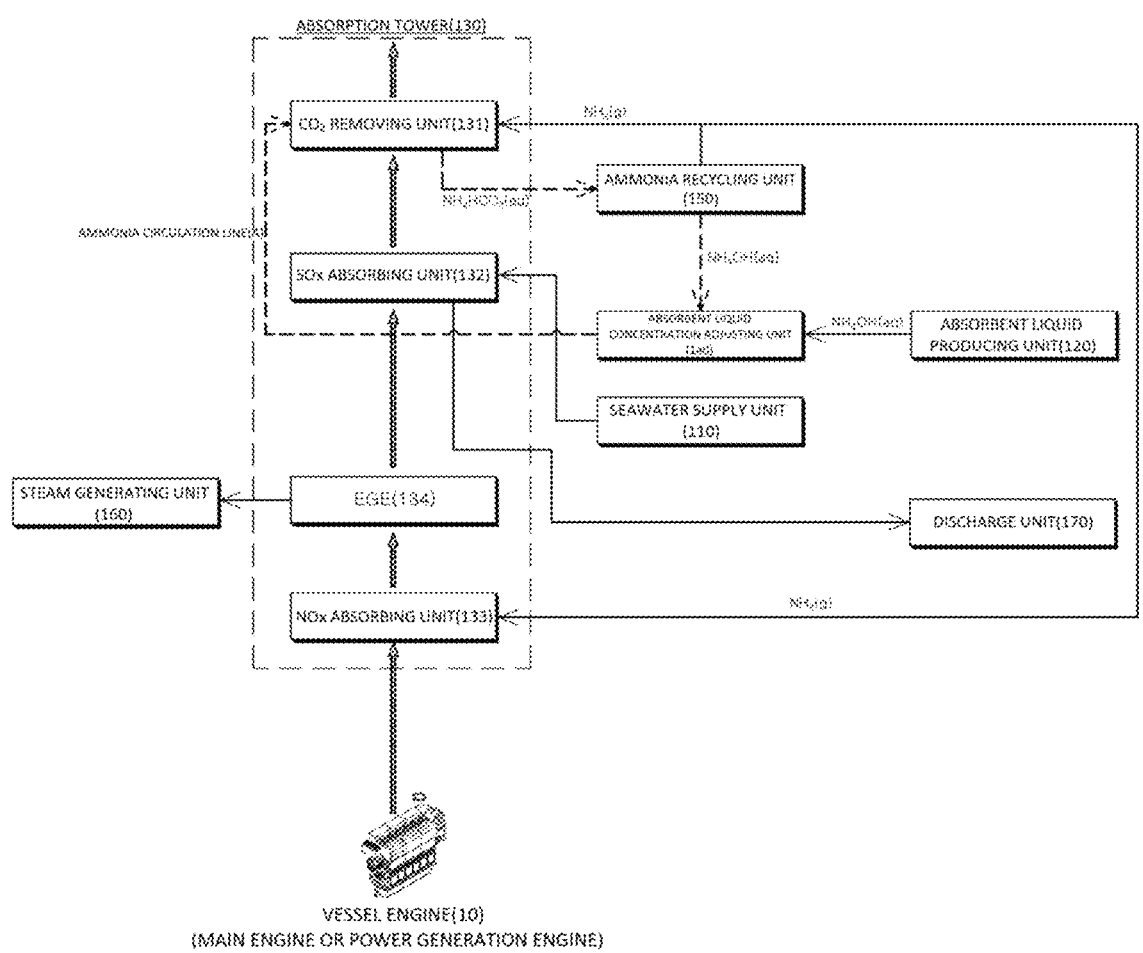
FIG. 1 is a schematic configuration diagram of an apparatus for reducing greenhouse gas emission in a vessel, according to an embodiment of the present invention.

Referring to FIG. 1, an apparatus for reducing greenhouse gas emission in a vessel according to an embodiment of the present invention includes: a seawater supply unit 110 that supplies seawater; an absorbent liquid producing unit 120 that produces and supplies a high-concentration $CO_2$ absorbent liquid; an absorption tower 130 including a $CO_2$ removing unit 131 that cools exhaust gas discharged from a vessel engine 10 by reacting the exhaust gas with the seawater supplied from the seawater supply unit 110 and removes $CO_2$ by reacting the cooled exhaust gas with the absorbent liquid supplied from the absorbent liquid producing unit 120 to convert $CO_2$ into an aqueous ammonium salt solution; an absorbent liquid concentration adjusting unit 140 that adjusts a concentration of the absorbent liquid supplied from the absorbent liquid producing unit 120 to the absorption tower 130; and an ammonia recycling unit 150 that recycles $NH_3$ by reacting the aqueous ammonium salt solution discharged from the absorption tower 130 with an aqueous divalent metal hydroxide solution and returns the $NH_3$ back to the absorption tower 130 for reuse as the absorbent liquid.

Here, according to the type and specification of the vessel engine (low-pressure engine or high-pressure engine) used in a main engine or power generation engine and the type of fuel supplied to the vessel engine (HFO, MDO, LNG, MGO, LSMGO, ammonia, etc.), the absorption tower may optionally include, in addition to the $CO_2$ removing unit, a $NO_x$ absorbing unit or a $SO_x$ absorbing unit, or may include both the $NO_x$ absorbing unit and the $SO_x$ absorbing unit.

In particular, when low sulphur marine gas oil (LSMGO) is used as the fuel of the vessel engine, a $SO_x$ absorbing unit capable of simultaneously performing cooling of exhaust gas and absorption by dissolution of $SO_x$ may be additionally provided.

Hereinafter, an embodiment in which the $NO_x$ absorbing unit, the $SO_x$ absorbing unit, and the $CO_2$ removing unit are sequentially stacked on the absorption tower will be described, but the present invention is not limited thereto. As described above, the $NO_x$ absorbing unit and/or the $SO_x$ absorbing unit may or may not be included according to the types of vessel engine and fuel.

Hereinafter, the apparatus for reducing greenhouse gas emission in the vessel will be described in detail with reference to FIGS. 1 to 9.

First, a seawater supply unit 110 supplies seawater to an absorption tower 130 so that temperature of exhaust gas is lowered to facilitate absorption of $CO_2$ by an absorbent liquid.

Figure 2:
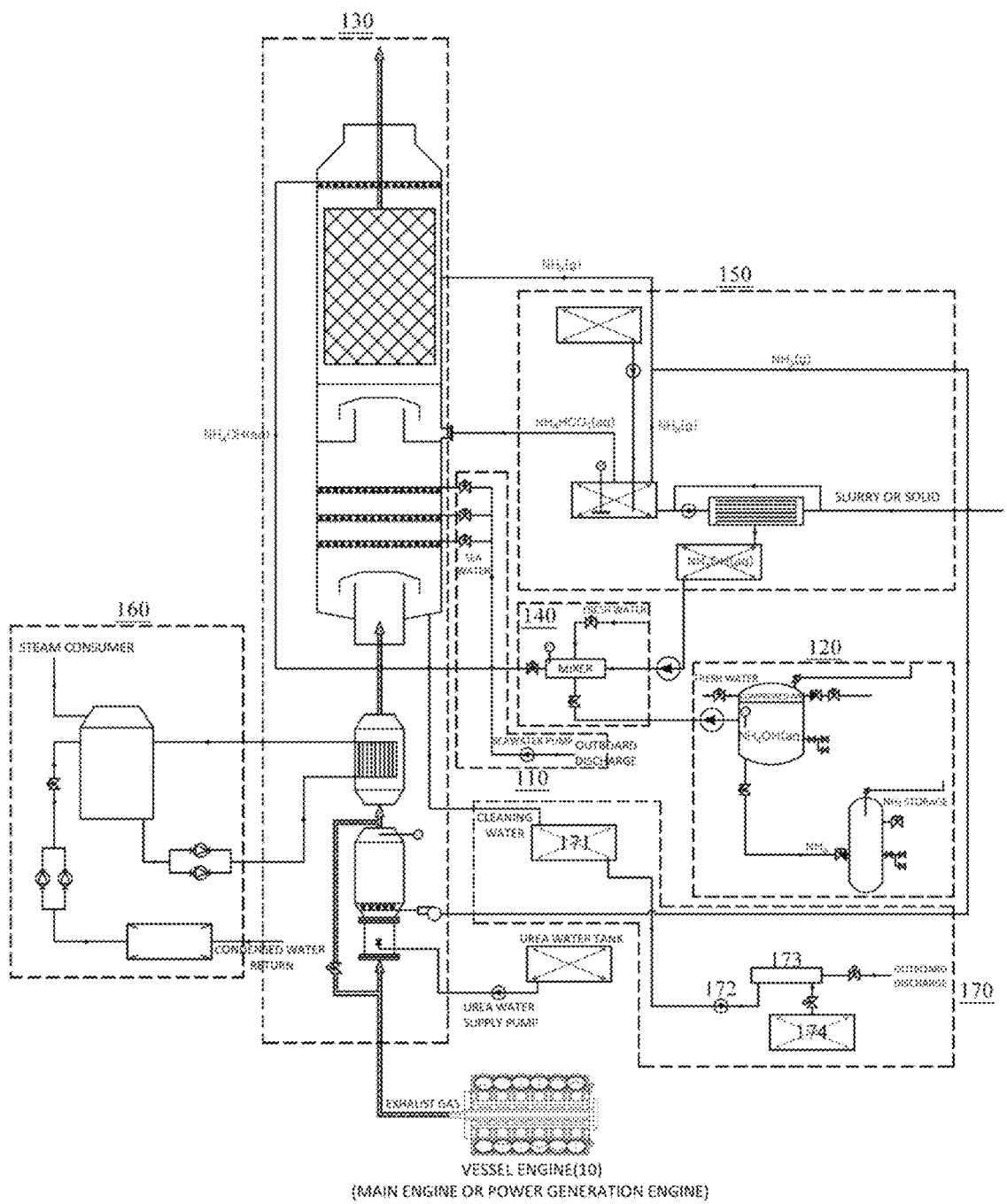
FIG. 2 is a circuit diagram of a system implementing the apparatus for reducing greenhouse gas emission in a vessel, illustrated in FIG. 1.
Figure 3:
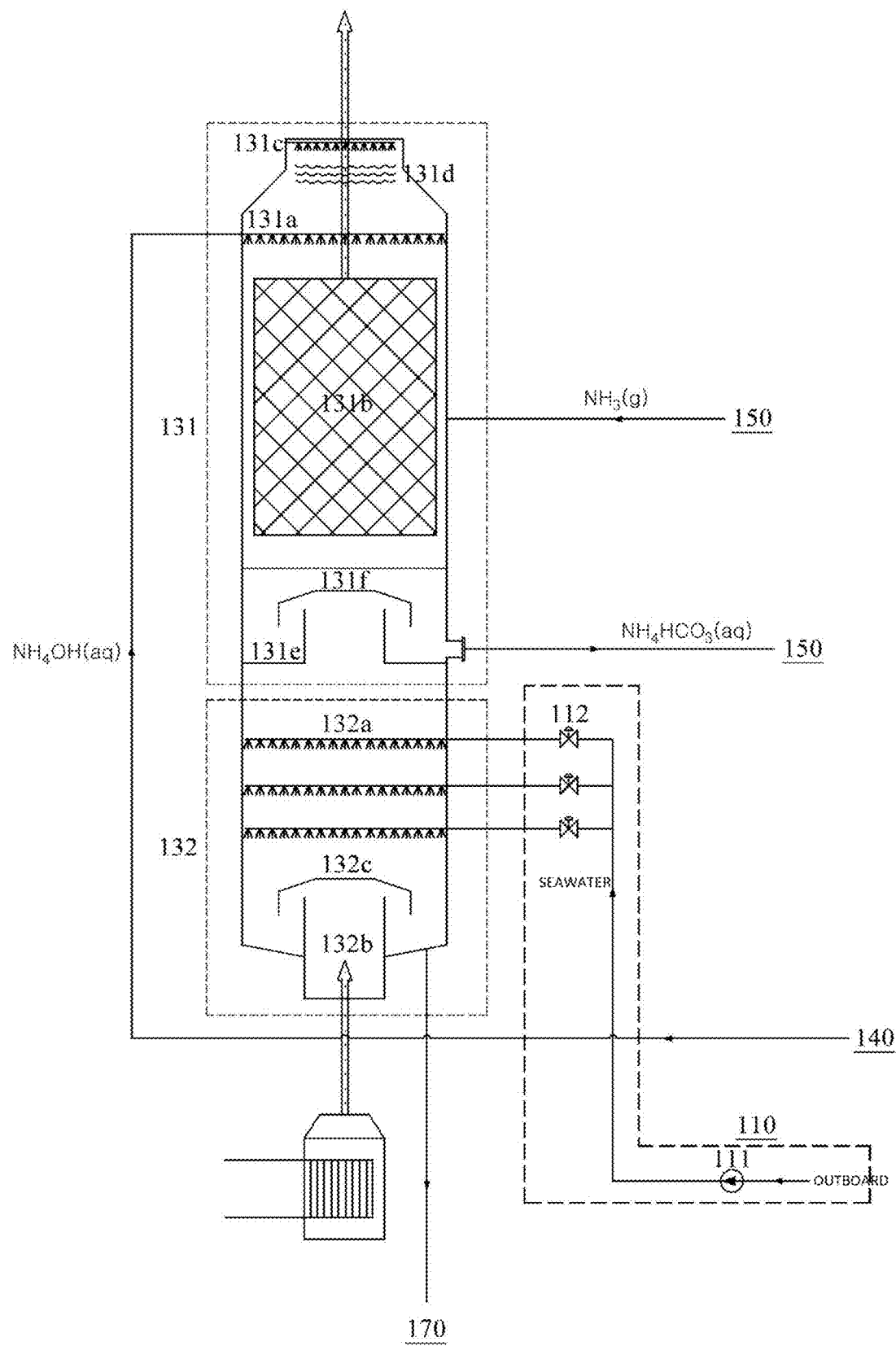
FIG. 3 separately illustrates a seawater supply unit of the apparatus for reducing greenhouse gas emission in a vessel, illustrated in FIG. 2.

Specifically, as illustrated in FIGS. 2 and 3, the seawater supply unit 110 may include: a seawater pump 111 that suctions seawater from the outside of the vessel through a sea chest (not illustrated) and pumps the seawater to a $SO_x$ absorbing unit 132 of the absorption tower 130; and a seawater control valve 112 that controls the amount of the seawater supplied to the $SO_x$ absorbing unit 132 according to the amount of exhaust gas. Here, the seawater pump 111 may separately include a suction pump that suctions the seawater from the outside of the vessel and a seawater transfer pump that pumps and transfers the seawater to the $SO_x$ absorbing unit 132.

For reference, when the vessel is berthing or sailing, seawater may be selectively supplied to the seawater pump 111 from a high sea chest that suctions upper seawater or a low sea chest that suctions lower seawater according to the depth of water. That is, when the vessel is berthing, the high sea chest may be used because the upper seawater is cleaner than the lower seawater, and when the vessel is sailing, the low sea chest may be used because the lower seawater is cleaner than the upper seawater.

Here, the seawater control valve 112 may be a manually operated diaphragm valve or a solenoid type valve that controls the flow rate of seawater, but the present invention is not limited thereto. Any type of valve may be applied as long as the amount of seawater injected through a seawater spray nozzle 132*a* can be controlled according to the amount of exhaust gas.

Next, the absorbent liquid producing unit 120 reacts fresh water with $NH_3$ as shown in [Chemical Formula 1] below to produce high-concentration ammonia water ($NH_4OH(aq)$), which is a high-concentration $CO_2$ absorbent liquid, and supplies the high-concentration ammonia water ($NH_4OH$ (aq)) to the absorption tower 130 through the absorbent liquid concentration adjusting unit 140.

$$NH_3+H_2O \longrightarrow NH_4OH(aq), \text{(exothermic reaction, 1650MJ/ton)} \quad \text{[Chemical Formula 1]}$$

Figure 4:
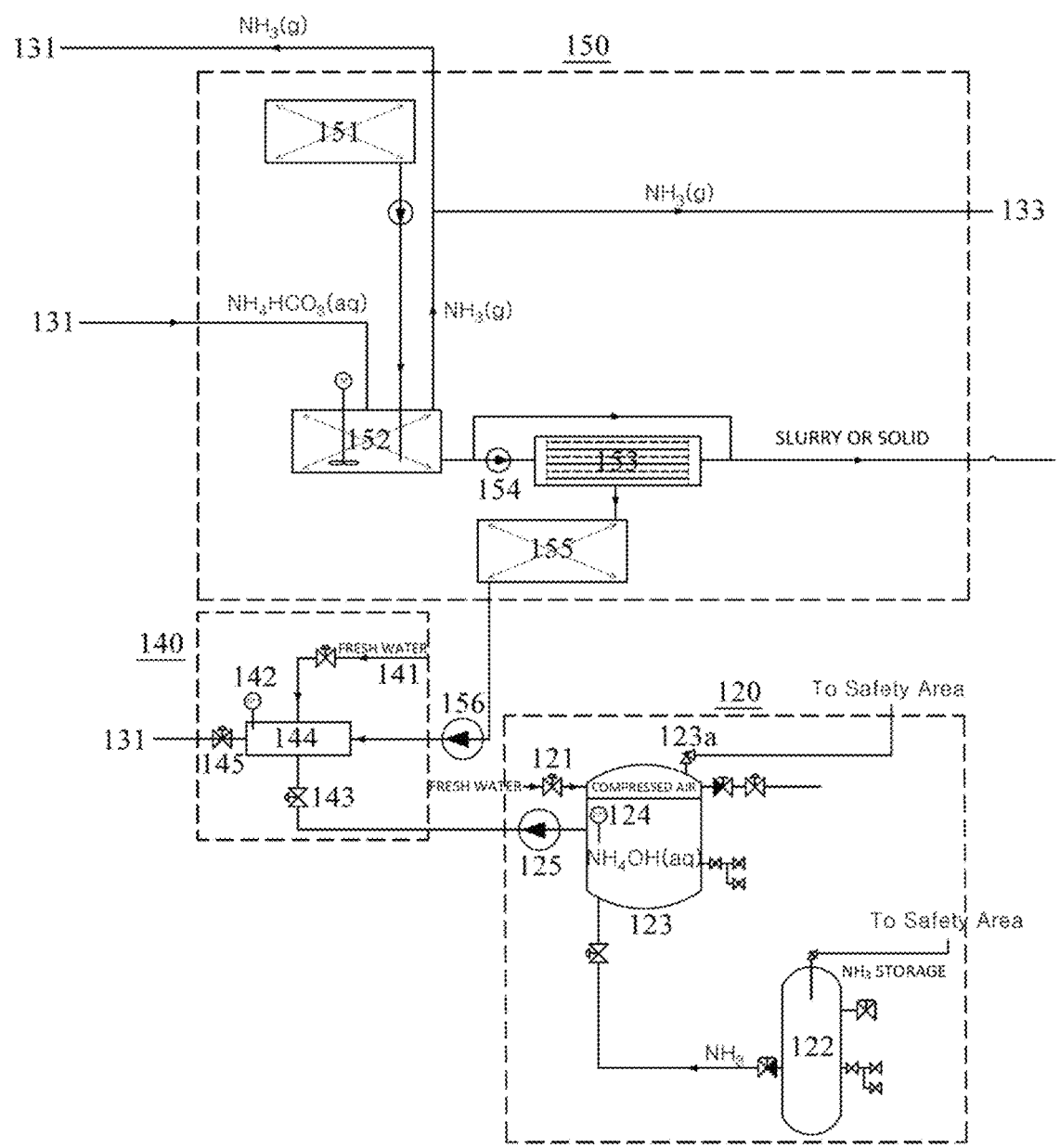
FIG. 4 separately illustrates an absorbent liquid producing unit, an absorbent liquid concentration adjusting unit, and an ammonia recycling unit of the apparatus for reducing greenhouse gas emission in a vessel, illustrated in FIG. 2.

Specifically, as illustrated in FIGS. 2 and 4, the absorbent liquid producing unit 120 may include: a fresh water tank (not illustrated) that stores fresh water; a fresh water control valve 121 that supplies the fresh water from the fresh water tank to an ammonia water tank 123; a $NH_3$ storage 122 that stores high-pressure $NH_3$; the ammonia water tank 123 that produces and stores high-concentration ammonia water by spraying $NH_3$ supplied from the $NH_3$ storage 122 to the fresh water supplied by the fresh water control valve 121; a pH sensor 124 that measures a concentration of the ammonia water in the ammonia water tank 123; and an ammonia water supply pump 125 that supplies the high-concentration ammonia water from the ammonia water tank 123 to the absorbent liquid concentration adjusting unit 140.

For example, the concentration of the ammonia water circulating through the absorption tower 130 and an ammonia recycling unit 150 changes as the operation is repeated. When the concentration of the ammonia water is reduced, the high-concentration ammonia water may be supplied to an ammonia water circulation line (see A in FIG. 1) to compensate for the reduced concentration of the ammonia water so that the ammonia water is constantly maintained at a designed concentration.

On the other hand, since the high-concentration ammonia water has a higher partial pressure of $NH_3(g)$ than that of the low-concentration ammonia water at the same temperature, $NH_3$ is relatively more evaporated in an atmospheric pressure state, resulting in an increase in loss. Therefore, in order to store the high-concentration ammonia water, it is necessary to lower temperature in order for increasing the solubility and reducing the vapor pressure of $NH_3(g)$ and to operate under a pressurization system.

That is, in order to prevent a phenomenon that $NH_3(g)$ is evaporated and lost to the atmosphere, compressed air of a constant pressure may be injected into the ammonia water tank 123 so that the pressure in the ammonia water tank 123 is maintained to be high, thereby preventing the evaporation loss of $NH_3$.

For example, since $NH_3$ may be stored in a liquid state at −34° C. and 8.5 bar, 50% concentration of ammonia water may be stored in the ammonia water tank 123 by maintaining the inside of the ammonia water tank 123 at a constant pressure by using compressed air of 7 bar available in the vessel.

In addition, a safety valve 123*a* for preventing overpressure of the ammonia water tank 123 may be installed.

Next, the absorption tower 130 includes a $CO_2$ removing unit that cools exhaust gas discharged from the vessel engine 10 by reacting the exhaust gas with the seawater supplied from the seawater supply unit 110, reacts $CO_2$ of the cooled exhaust gas with ammonia water, which is the absorbent liquid from the absorbent liquid producing unit 120, and converts $CO_2$ into an aqueous ammonium salt solution ($NH_4HCO_3(aq)$) to remove $CO_2$ as shown in [Chemical Formula 2] below.

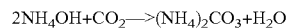

 [Chemical Formula 2]

Specifically, as illustrated in FIG. 3, the $CO_2$ removing unit 131 may include: an ammonia water spray nozzle 131*a* that sprays the ammonia water supplied from the absorbent liquid concentration adjusting unit 140 downward; a packing material 131*b* that contacts $CO_2$ of the exhaust gas with the ammonia water, which is the absorbent liquid, and converts $CO_2$ into $NH_4HCO_3(aq)$; a cooling jacket (not illustrated) that is formed in multi-stages for each section of an absorption apparatus filled with the packing material 131*b* and cools heat generated by the $CO_2$ absorption reaction; a water spray 131*c* that collects $NH_3$ discharged to the outside without reacting with $CO_2$; a mist removal plate 131*d* that is formed in a curved multi-plate shape and returns the ammonia water scattered when sprayed by the ammonia water spray nozzle 131*a* toward the packing material 131*b*; a partition wall 131*e* formed so that the ammonia water passing through the packing material 131*b* does not flow back to the $SO_x$ absorbing unit 132; and an umbrella-shaped blocking plate 131f that covers an exhaust gas inlet hole surrounded by the partition wall 131e.

Here, the cooling jacket may cool heat to 30° C. to 50° C. at which the material transfer is smoothest, so that $NH_3$ is not evaporated and disappeared while maintaining a $CO_2$ absorption rate at a certain level.

Figure 8:
FIG. 8 illustrates various packing materials applied to the apparatus for reducing greenhouse gas emission in a vessel, illustrated in FIG. 2.
Figure 9:
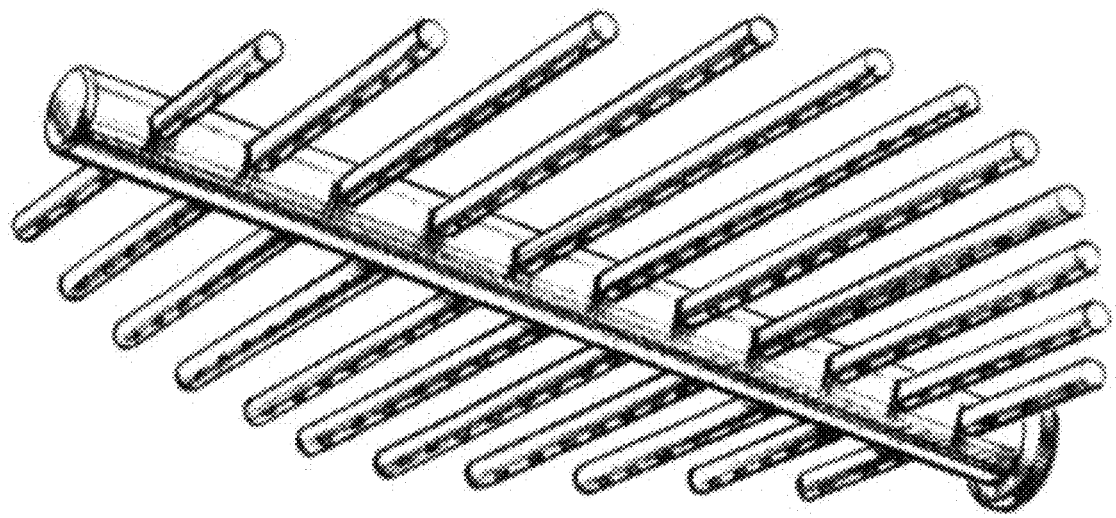
FIG. 9 illustrates an ammonia water spray nozzle applied to the apparatus for reducing greenhouse gas emission in a vessel, illustrated in FIG. 2.
Figure 9:
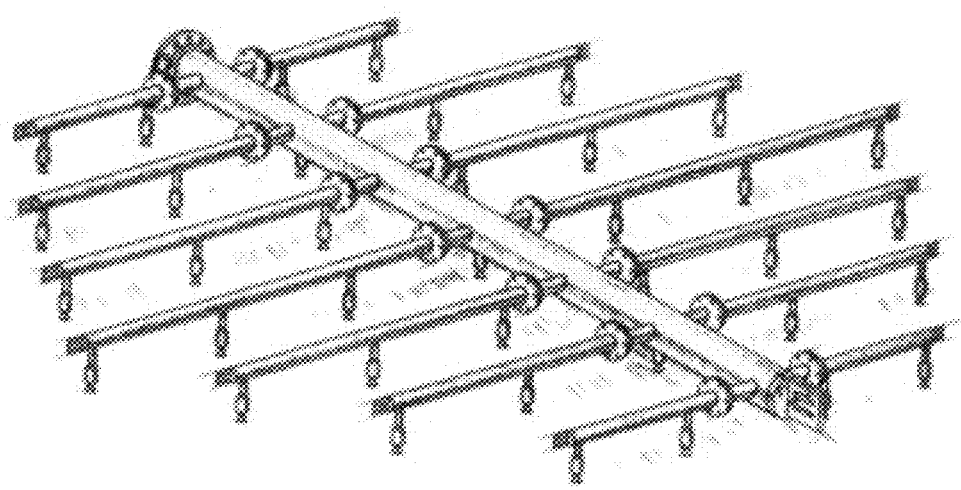

On the other hand, the $CO_2$ removing unit 131 may be considered in various forms so as to operate within an allowable pressure drop of an exhaust pipe required by an engine specification while increasing a contact area between the exhaust gas and $NH_3$. For example, the packing material 131b may include multi-stage distilling column packings designed to increase a contact area per unit volume. As illustrated in FIG. 8, a distilling column packing suitable for an absorption process may be selected considering the contact area per unit area, the pressure drop of gas, and the flooding velocity. As illustrated in FIG. 9, the ammonia water spray nozzle 131a may be provided in a ladder pipe form FIG. 9A or a spray form FIG. 9B.

In addition, a solution redistributor (not illustrated) may be formed between the distilling column packings so as to prevent channeling when the ammonia water passes downward through the packing material 131b, the exhaust gas passes upward through the packing material 131b, and the ammonia water and the exhaust gas contact each other.

In addition, the mist removal plate 131d allows the scattered ammonia water to adhere to the curved multi-plate, so that droplets become large, and drains the ammonia water toward the packing material 131b by the own weight thereof.

On the other hand, as described above, the vessel engine 10 is based on the premise of using LNG or LSMGO as fuel. When the vessel engine 10 uses LNG as fuel, $SO_x$ may not be generated, but when the vessel engine 10 uses LSMGO as fuel, the absorption tower 130 may include the $SO_x$ absorbing unit 132.

That is, the $SO_x$ absorbing unit 132 may dissolve and remove $SO_x$ while cooling the exhaust gas discharged from the vessel engine 10 by reacting the exhaust gas with the seawater supplied from the seawater supply unit 110, and the $CO_2$ removing unit 131 may cool the exhaust gas, from which $SO_x$ is removed, through reaction with the seawater supplied from the seawater supply unit 110, react the cooled exhaust gas with the absorbent liquid supplied from absorbent liquid producing unit 120, and convert $CO_2$ into an aqueous ammonium salt solution, and absorb and remove $CO_2$.

Figure 6:
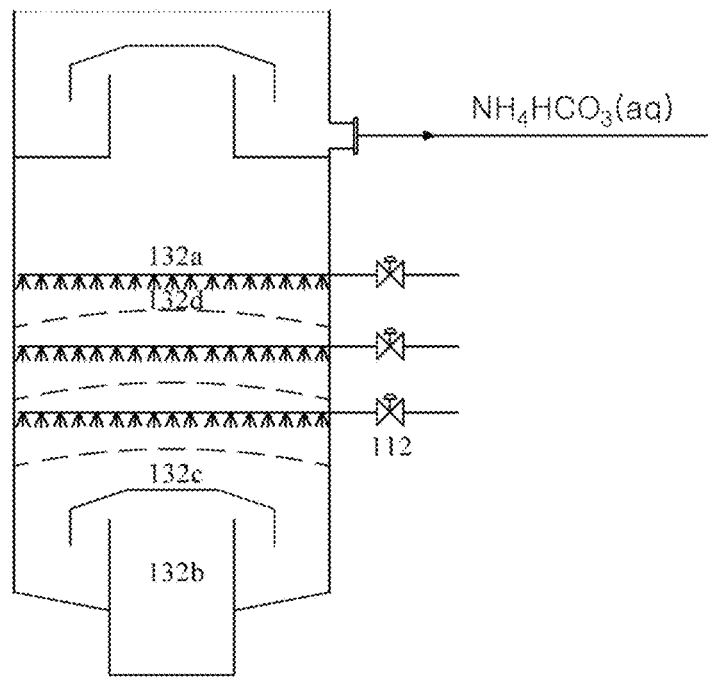
FIG. 6 separately illustrates a $SO_x$ absorbing unit of the absorption tower of FIG. 5.
Figure 6:
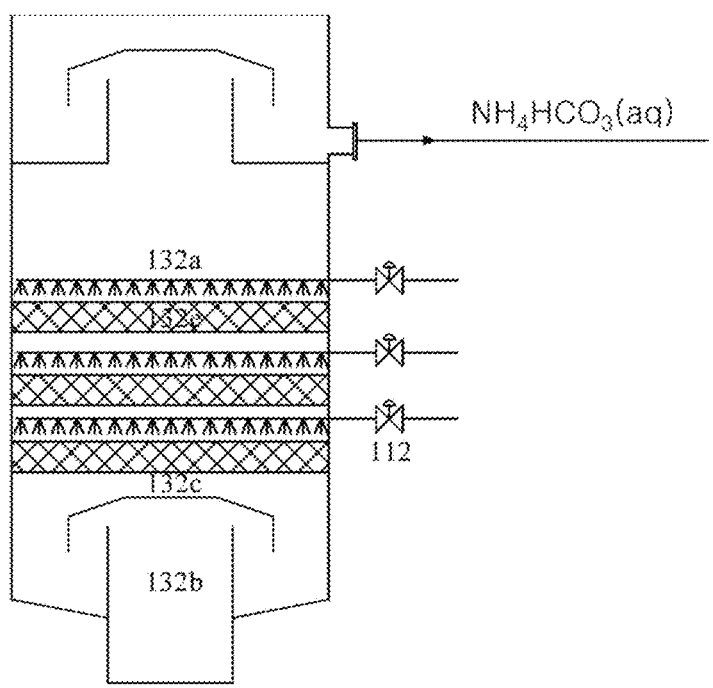

Specifically, the $SO_x$ absorbing unit 132 is a section that is in primary contact with seawater. As illustrated in FIGS. 3 and 6, the $SO_x$ absorbing unit 132 may include: a multi-stage seawater spray nozzle 132a that dissolves $SO_x$ by spraying the seawater supplied from the seawater supply unit 110 downward and removes dusts such as soot; and a partition wall-shaped exhaust gas inlet pipe 132b that prevents cleaning water from flowing back, or an umbrella-shaped blocking plate 132c that covers the exhaust gas inlet pipe 132b.

On the other hand, the $SO_x$ absorbing unit 132 may cool the temperature of the exhaust gas to 27° C. to 33° C., preferably about 30° C., which is required by the $CO_2$ removing unit 131, through the seawater spray nozzle 132a or a separate cooling jacket (not illustrated). As illustrated in FIG. 6A, porous upper plates 132d having a passage through which the exhaust gas passes may be respectively formed in multi-stages under the seawater spray nozzle 132a, so that the seawater and the exhaust gas come into smooth contact with each other. As illustrated in FIG. 6B, an absorption apparatus 132e filled with a packing material for allowing the seawater and the exhaust gas to come into contact with each other may be formed under the seawater spray nozzle 132a, so that the seawater dissolves $SO_x$.

On the other hand, a closed loop system may be applied to add a compound forming alkali ions, for example, a basic chemical of NaOH or MgO, to the seawater supplied to the $SO_x$ absorbing unit 132 in order to further increase the solubility of $SO_x$.

For reference, the closed loop system involves additional consumption of basic chemicals, but has an advantage that the amount of circulating seawater is small, and the open loop system that discharges $SO_x$ dissolved by spraying only seawater to the outside of the vessel has no additional consumption of basic chemicals and is simple. In order to maximize these advantages, a hybrid system in which the open loop system and the closed loop system are combined may be applied.

In this regard, by removing $SO_x$ through the $SO_x$ absorbing unit 132 and then removing $CO_2$ through the $CO_2$ removing unit 131, it is possible to solve the problem that it is difficult to remove $CO_2$ until $SO_x$ is completely dissolved because the solubility of $SO_x$ is high and thus $SO_x$ is first changed to a compound such as $NaSO_3$, thereby improving the solubility of $CO_2$ and the removal efficiency of $CO_2$.

Here, cleaning water drained to a discharge unit 170 after $SO_x$ is absorbed by the $SO_x$ absorbing unit 132 contains $SO_3^-$, $SO_4^{2-}$, soot, $NaSO_3$, $Na_2SO_4$, $MgCO_3$, $MgSO_4$, and other ionic compounds together.

On the other hand, as described above, the absorption tower 130 may further include a $NO_x$ absorbing unit 133 that absorbs and removes $NO_x$ from the exhaust gas discharged from the vessel engine 10. The absorption tower 130 may cool the exhaust gas, from which $NO_x$ has been removed, through reaction with the seawater supplied from the seawater supply unit 110 and may remove $CO_2$ by reacting the cooled exhaust gas with the absorbent liquid supplied from the absorbent liquid producing unit 120 to convert $CO_2$ into an aqueous ammonium salt solution.

That is, in the absorption tower 130, the $NO_x$ absorbing unit 133 that absorbs and removes $NO_x$ from the exhaust gas discharged from the vessel engine 10, the $SO_x$ absorbing unit 132 that dissolves and removes $SO_x$ while cooling the exhaust gas, from which the $NO_x$ has been removed, through reaction with the seawater, and the $CO_2$ removing unit 131 that removes $CO_2$ by reacting the exhaust gas, from which the $SO_x$ has been removed, with the ammonia water supplied from the absorbent liquid producing unit 120 to convert $CO_2$ into $NH_4HCO_3$(aq) are stacked in the vertical direction to sequentially absorb and remove the $NO_x$, the $SO_x$, and the $CO_2$.

Therefore, since the $CO_2$ removing unit 131 removes $CO_2$ by reacting the ammonia water with the exhaust gas from which $NO_x$ and $SO_x$ have been removed, side reactions caused by $NO_x$ and $SO_x$ do not occur during the $CO_2$ removal process, thereby minimizing the generation of impurities and obtaining $NH_4HCO_3$ with less impurities in a subsequent process.

Here, the absorption tower 130 may include the $CO_2$ removing unit 131, the $SO_x$ absorbing unit 132, the $NO_x$ absorbing unit 133, and an exhaust gas economizer (EGE) 134 to be described later, may be modularized and combined with individual modules, and may be integrated in a single tower form, and the absorption tower 130 itself may include a single tower or a group of a plurality of towers.

Figure 5:
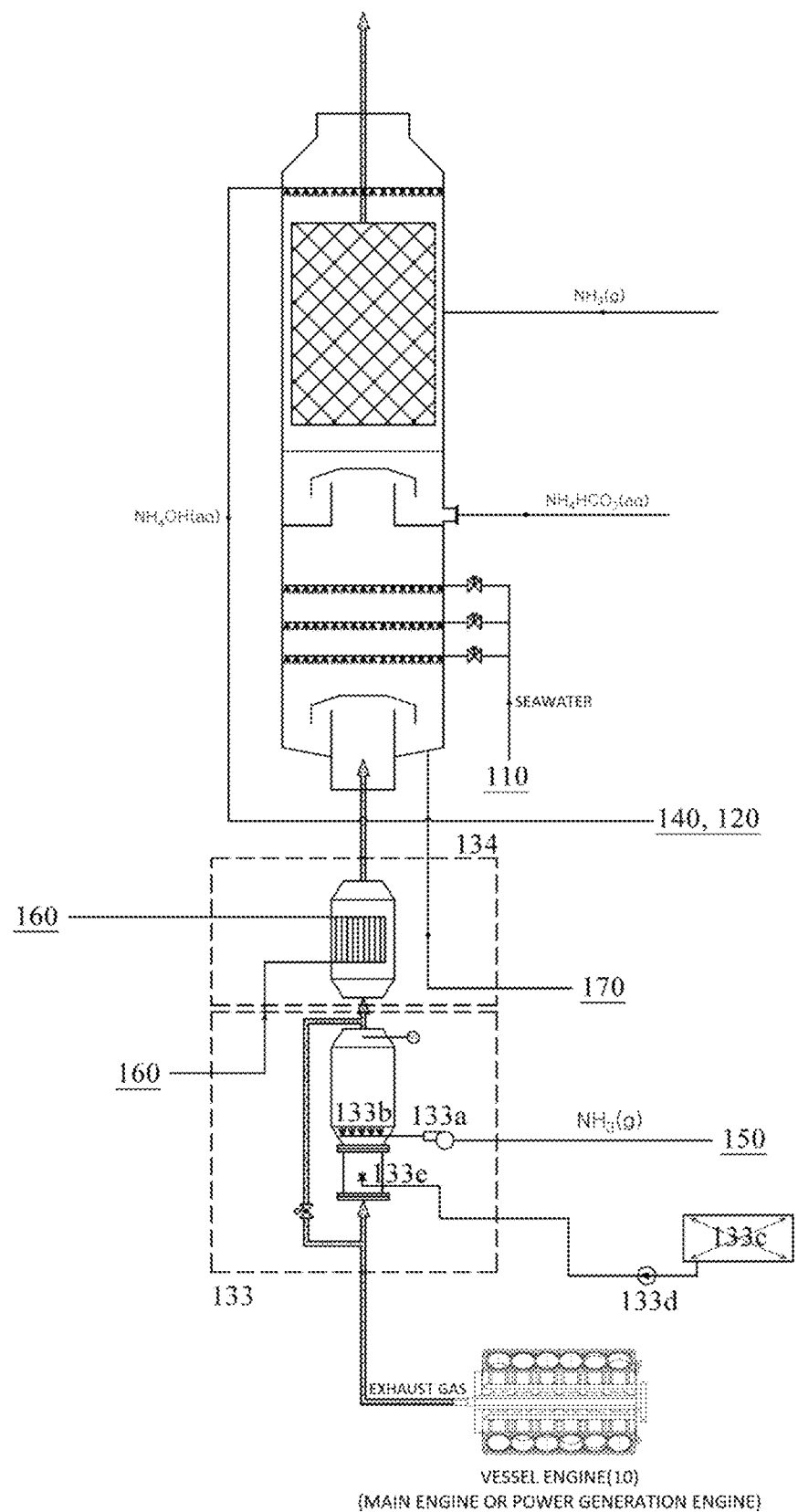
FIG. 5 separately illustrates an absorption tower of the apparatus for reducing greenhouse gas emission in a vessel, illustrated in FIG. 2.

Specifically, the $NO_x$ absorbing unit 133 is a selective catalyst reactor (SCR). As illustrated in FIG. 5, the $NO_x$ absorbing unit 133 may directly supply $NH_3$ from the ammonia recycling unit 150 to a first NH₃ spray nozzle 133b through a blower 133a or a compressor, or when NH₃ is insufficient, may receive urea water of a urea water storage tank 133c from a second NH₃ spray nozzle 133e through a urea water supply pump 133d so as to compensate for the loss or lack of NH₃.

On the other hand, since NH₃ and CO₂ are generated when the urea water is decomposed, it may be preferable that NH₃ is directly supplied to reduce the amount of CO₂ generated.

In addition, the absorption tower 130 may further include an EGE 134 that is formed between the NO$_x$ absorbing unit 133 and the SO$_x$ absorbing unit 132 and performs heat exchange between waste heat of the vessel engine 10 and boiler water.

Next, the absorbent liquid concentration adjusting unit 140 adjusts the concentration of the circulating absorbent liquid that is supplied from the absorbent liquid producing unit 120 to the absorption tower 130.

For example, when the concentration of the ammonia water circulating through the ammonia water circulation line A is low, the amount of (NH₄)₂CO₃ produced in [Chemical Formula 2] decreases, resulting in an increase in the amount of CO₂ emitted. When the concentration of the ammonia water is high, the amount of CaCO₃ or MgCO₃ produced increases more than necessary due to excessive CO₂ absorption. Thus, the absorbent liquid concentration adjusting unit 140 has to constantly maintain the concentration of the ammonia water so that the CO₂ absorption performance of the absorption tower 130 is kept.

In order to achieve this purpose, the absorbent liquid concentration adjusting unit 140 may be designed to adjust the concentration of the ammonia water to 12% by mass by mixing the high-concentration ammonia water of the absorbent liquid producing unit 120 with the low-concentration ammonia water circulating through the ammonia water circulation line A, but the absorbent liquid concentration adjusting unit 140 is not limited thereto and may be changed according to the conditions of use.

That is, as illustrated in FIG. 4, the absorbent liquid concentration adjusting unit 140 may include: a fresh water supply line 141 that supplies fresh water; a pH sensor 142 that measures the concentration of ammonia water which is the absorbent liquid supplied to the absorption tower 130; a flow rate control valve 143 that controls a flow rate of high-concentration ammonia water supplied from the absorbent liquid producing unit 120 by the operation of the ammonia water supply pump 125; a mixer 144 that adjusts the concentration of the ammonia water by increasing the concentration by mixing the high-concentration ammonia water from the absorbent liquid producing unit 120 or reducing the concentration by mixing the fresh water from the fresh water supply line 141 according to the concentration of the ammonia water measured by the pH sensor 142; and a pressure maintenance valve 145 that prevents evaporation of NH₃ when the mixer 144 performs the mixing.

Here, the mixer 144 may be formed in various forms as a pipe or a structure provided with blades capable of causing a vortex of fluid in order for smooth mixing, and the pressure maintenance valve 145 may be formed at a discharge port of the mixer 144 to maintain a high pressure even during mixing, thereby preventing NH₃(g) from being evaporated and disappeared from the high-concentration ammonia water.

Next, the ammonia recycling unit 150 may recycle NH₃ by reacting an aqueous ammonium salt solution discharged from the absorption tower 130 with an aqueous divalent metal hydroxide solution based on the following [Chemical Formula 3] and [Chemical Formula 4], may return NH₃ back to the absorption tower 130 for reuse as a CO₂ absorbent liquid, may store or discharge CO₂ in the form of CaCO₃(s) or MgCO₃(s), or may supply NH₃ to the NO$_x$ absorbing unit 133 so as to absorb NO$_x$.

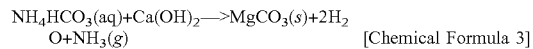
[Chemical Formula 3]

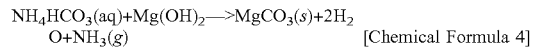
[Chemical Formula 4]

Specifically, as illustrated in FIG. 4, the ammonia recycling unit 150 may include: a storage tank 151 that stores an aqueous divalent metal hydroxide solution (Ca(OH)₂ or Mg(OH)₂); a mixing tank 152 in which the aqueous divalent metal hydroxide solution and the aqueous ammonium salt solution (NH₄HCO₃(aq)) discharged from the absorption tower 130 are stirred by an agitator to generate NH₃(g) and carbonate; a filter 153 that suctions a solution and precipitate from the mixing tank 152 and separates carbonate; a high-pressure pump 154 that transfers the solution and precipitate to the filter 153 at high pressure; an ammonia water storage tank 155 that stores the ammonia water (or fresh water) separated by the filter 153 and supplies the ammonia water (or fresh water) to the absorbent liquid concentration adjusting unit 140; an ammonia water circulation pump 156 that supplies the ammonia water from the ammonia water storage tank 155 to the absorbent liquid concentration adjusting unit 140; and a separate storage tank (not illustrated) that stores carbonate (CaCO₃(s) or MgCO₃(s)) separated by the filter 153 in a slurry state or a solid state transferred to a dryer (not illustrated) and solidified.

Here, the reaction is continuously performed by the agitator installed in the mixing tank 152, and a constant temperature may be maintained so that the reaction is smoothly performed.

In addition, in the storage tank 151, the aqueous divalent metal hydroxide solution (Ca(OH)₂ or Mg(OH)₂) is generated by reacting the fresh water with the metal oxide (CaO or MgO), is stored therein, and is supplied to the mixing tank 152.

In this manner, since only the relatively inexpensive metal oxide (CaO or MgO) or aqueous divalent metal hydroxide solution (Ca(OH)₂ or Mg(OH)₂) is added, no additional addition of water is required, there is no decrease in the concentration of ammonia water, the capacity size of the filter 153 may be reduced, and the NH₃ recycling cost may be reduced. That is, in theory, only the metal oxide is consumed and NH₃ and fresh water are reused, thereby significantly reducing the CO₂ removal cost.

In addition, the filter 153 suctions the solution and precipitate from the mixing tank 152, transfers NaHCO₃ and other by-product precipitates at high pressure by the high-pressure pump 154, separates carbonate, and stores carbonate in a solid state or discharges carbonate to the outside of the vessel. Here, as an example of the filter 153, a membrane filter suitable for precipitate separation by high-pressure fluid transfer may be applied.

In addition, the ammonia water circulation pump 156 may be provided as a centrifugal pump type pump so that a large amount of ammonia water circulates through the ammonia water circulation line A.

Figure 7:
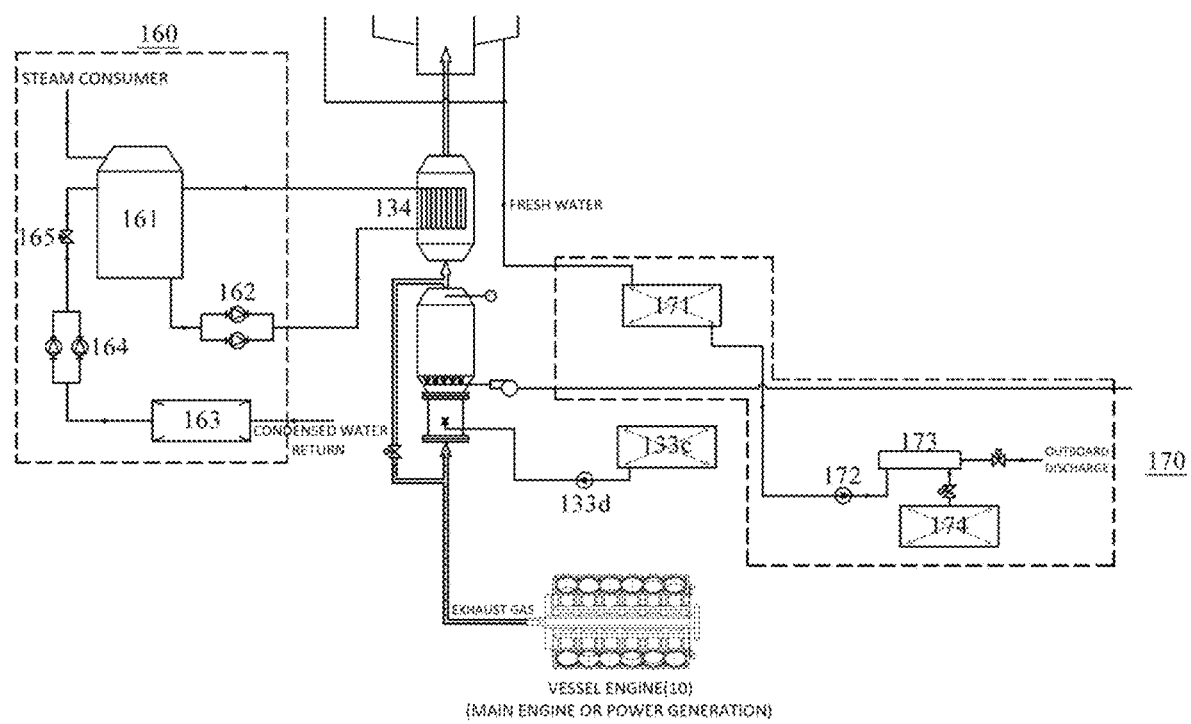
FIG. 7 separately illustrates a steam generating unit and a discharge unit of the apparatus for reducing greenhouse gas emission in a vessel, illustrated in FIG. 2.

Next, as illustrated in FIG. 7, the steam generating unit 160 may include: an auxiliary boiler 161 that receives a mixture in the form of saturated water and steam heat-exchanged through the EGE 134, separates the steam by a steam drum (not illustrated), and supplies the separated steam to a steam consumer; a boiler water circulation pump 162 that circulates and supplies boiler water from the auxiliary boiler 161 to the EGE 134; a cascade tank 163 that recovers condensed water condensed and phase-changed after being consumed from the steam consumer; and a supply pump 164 and a control valve 165 that supply boiler water from the cascade tank 163 to the auxiliary boiler 161 while controlling the amount of boiler water. The steam generating unit 160 generates and supplies steam required for heating devices in the vessel.

Here, when the load of the vessel engine 10 is large, the amount of heat that may be provided from the exhaust gas is large, and thus the amount of steam required in the vessel may be sufficiently produced through the EGE 134; otherwise, the auxiliary boiler 161 itself may burn fuel to produce necessary steam.

Next, as illustrated in FIG. 7, the discharge unit 170 may include: a cleaning water tank 171 that stores cleaning water discharged from the absorption tower 130; a water treatment device 173 including a filtering unit that controls turbidity to satisfy the outboard discharge condition of the cleaning water transferred from the cleaning water tank 171 by the transfer pump 172, and a neutralizing agent injecting unit that controls pH; and a sludge storage tank 174 that separates and stores solid emissions such as soot. The discharge unit 170 may discharge the cleaning water, which passes through the water treatment device 173 and satisfies the outboard discharge condition, to the outside of the vessel, and may separately store the solid emissions, such as soot, which do not satisfy the outboard discharge conditions, in the sludge storage tank 174.

On the other hand, NaOH may be used as the neutralizing agent for satisfying the outboard discharge condition. However, assuming that the materials discharged from the absorption tower 130 are acidic and basic, a neutralizing agent capable of neutralizing each of the acidic material and the basic material may be selected and used as necessary.

On the other hand, according to another embodiment of the present invention, a vessel including the apparatus for reducing greenhouse gas emission may be provided.

Therefore, the apparatus for reducing greenhouse gas emission in the vessel has the following effects. The concentration of greenhouse gas absorbing liquid may be maintained constant to prevent the decrease in absorption performance of an absorption tower. A pressurization system may be applied to prevent the loss of absorbent liquid due to the natural evaporation of high-concentration absorbent liquid. In order to satisfy the IMO greenhouse gas emission regulations, greenhouse gas may be converted into materials that do not affect environments and then separately discharged or may be converted into useful materials and then stored. $NH_3$ may be recycled to minimize consumption of relatively expensive $NH_3$. The capacity size of the rear end of a filter may be reduced. Greenhouse gas may be stored in the form of carbonate that exists in a natural state so that greenhouse gas may be discharged to the sea. Side reactions caused by $SO_x$ remaining during $NH_3$ recycling may be removed, thereby minimizing the loss of $NH_3$ and preventing impurities from being included when recovering ammonia.

Figure 10:
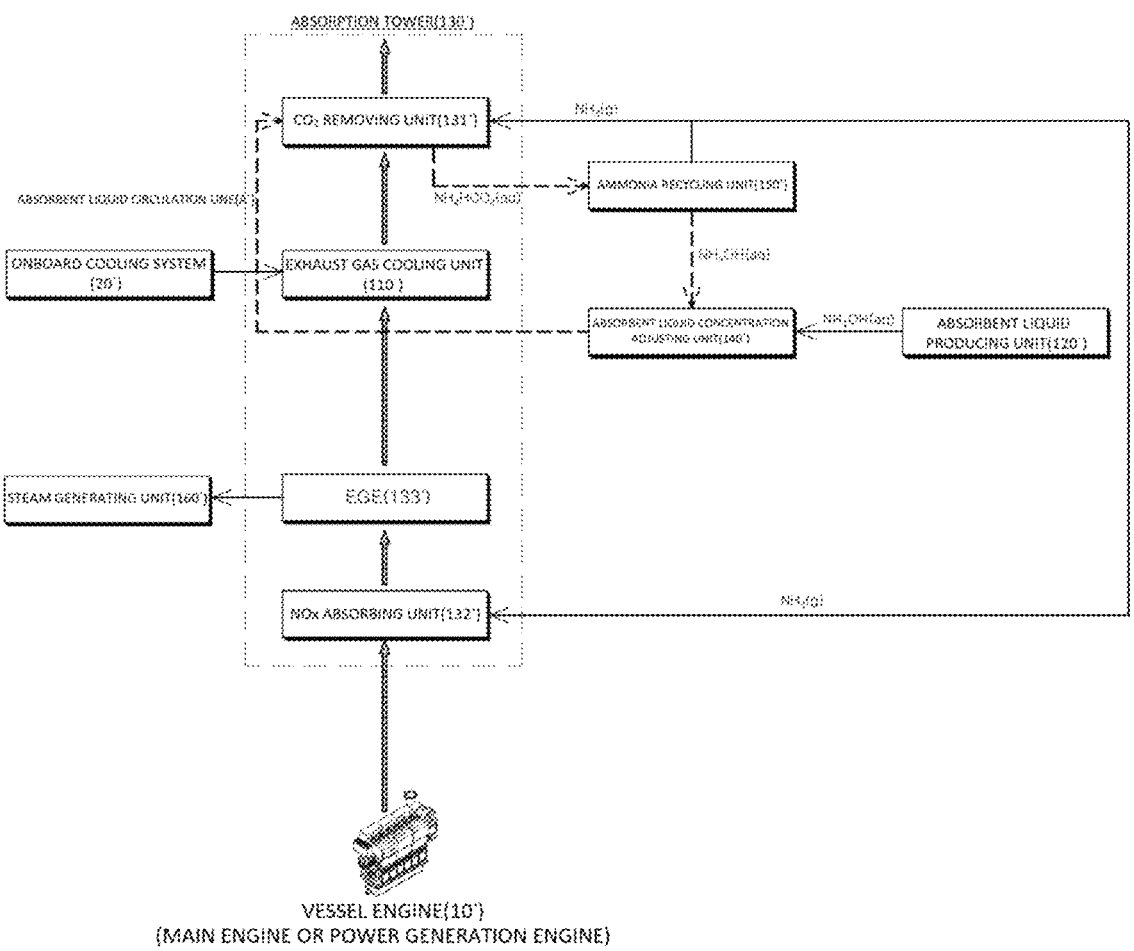
FIG. 10 is a schematic configuration diagram of an apparatus for reducing greenhouse gas emission in a vessel, according to another embodiment of the present invention.

On the other hand, referring to FIG. 10, an apparatus for reducing greenhouse gas emission in a vessel according to still another embodiment of the present invention may include: an exhaust gas cooling unit 110' that cools exhaust gas discharged from a vessel engine 10'; an absorbent liquid producing unit 120' that produces and supplies a high-concentration $CO_2$ absorbent liquid; an absorption tower 130' including a $CO_2$ removing unit 131' that removes $CO_2$ by reacting the exhaust gas cooled by the exhaust gas cooling unit 110' with the absorbent liquid supplied from the absorbent liquid producing unit 120' to convert $CO_2$ into an aqueous ammonium salt solution; an absorbent liquid concentration adjusting unit 140' that controls the concentration of the absorbent liquid supplied from the absorbent liquid producing unit 120' to the absorption tower 130'; and an ammonia recycling unit 150' that recycles $NH_3$ by reacting the aqueous ammonium salt solution discharged from the absorption tower 130' with an aqueous divalent metal hydroxide solution and returns $NH_3$ back to the absorption tower 130' for reuse as an absorbent liquid. Therefore, the exhaust gas is cooled with the fresh water by a heat exchange method, thereby preventing the decrease in the concentration of the absorbent liquid, and the concentration of the absorbent liquid is adjusted to constantly maintain the concentration of the absorbent liquid, thereby preventing the decrease in absorption performance.

Here, according to the type and specification of the vessel engine (low-pressure engine or high-pressure engine) used in a main engine or power generation engine and the type of fuel supplied to the vessel engine (HFO, MDO, LNG, MGO, LSMGO, ammonia, etc.), the absorption tower may optionally include, in addition to the $CO_2$ removing unit, a $NO_x$ absorbing unit or a $SO_x$ absorbing unit, or may include both the $NO_x$ absorbing unit and the $SO_x$ absorbing unit.

In particular, when LNG is used as the fuel of the vessel engine, $SO_x$ is not generated, and thus a separate $SO_x$ absorbing unit need not be installed. However, when LSMGO is used, a small amount of $SO_x$ may be generated, and thus a $SO_x$ absorbing unit capable of simultaneously performing cooling of exhaust gas and absorption by dissolution of $SO_x$ may be additionally provided.

Hereinafter, an embodiment in which, when LNG or LSMGO is used as the fuel of the vessel engine, the $NO_x$ absorbing unit, the exhaust gas cooling unit, and the $CO_2$ removing unit are sequentially stacked on the absorption tower will be described, but the present invention is not limited thereto. As described above, the $NO_x$ absorbing unit may or may not be included according to the types of vessel engine and fuel.

Hereinafter, the apparatus for reducing greenhouse gas emission in the vessel will be described in detail with reference to FIGS. 10 to 16.

First, the exhaust gas cooling unit 110' cools exhaust gas discharged from the vessel engine 10' so that temperature of the exhaust gas is lowered to facilitate absorption of $CO_2$ by an absorbent liquid.

For example, the exhaust gas cooling unit 110' may cool the exhaust gas discharged from the vessel engine 10' by a heat exchange method of the fresh water. Specifically, the exhaust gas may be cooled by the heat exchange with the fresh water to a temperature of 27° C. to 33° C. by circulating the fresh water supplied from an onboard cooling system 20' to a heat exchange pipe 111' surrounding an exhaust gas discharge pipe through which the exhaust gas flows.

That is, in a water cooling method in which the exhaust gas is directly cooled by the fresh water, the concentration of the absorbent liquid is lowered due to the addition of the fresh water, resulting in the deterioration in the greenhouse gas absorption performance. By improving the water cooling method, the exhaust gas is cooled by a heat exchange method, thereby preventing the decrease in the concentration of the absorbent liquid and constantly maintaining the greenhouse gas absorption performance.

Next, the absorbent liquid producing unit 120' reacts fresh water with $NH_3$ as shown in [Chemical Formula 5] below to produce high-concentration ammonia water ($NH_4OH(aq)$), which is a high-concentration $CO_2$ absorbent liquid, and supplies the high-concentration ammonia water ($NH_4OH$ (aq)) to the absorption tower 130' through the absorbent liquid concentration adjusting unit 140'.

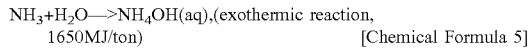

[Chemical Formula 5]

Figure 11:
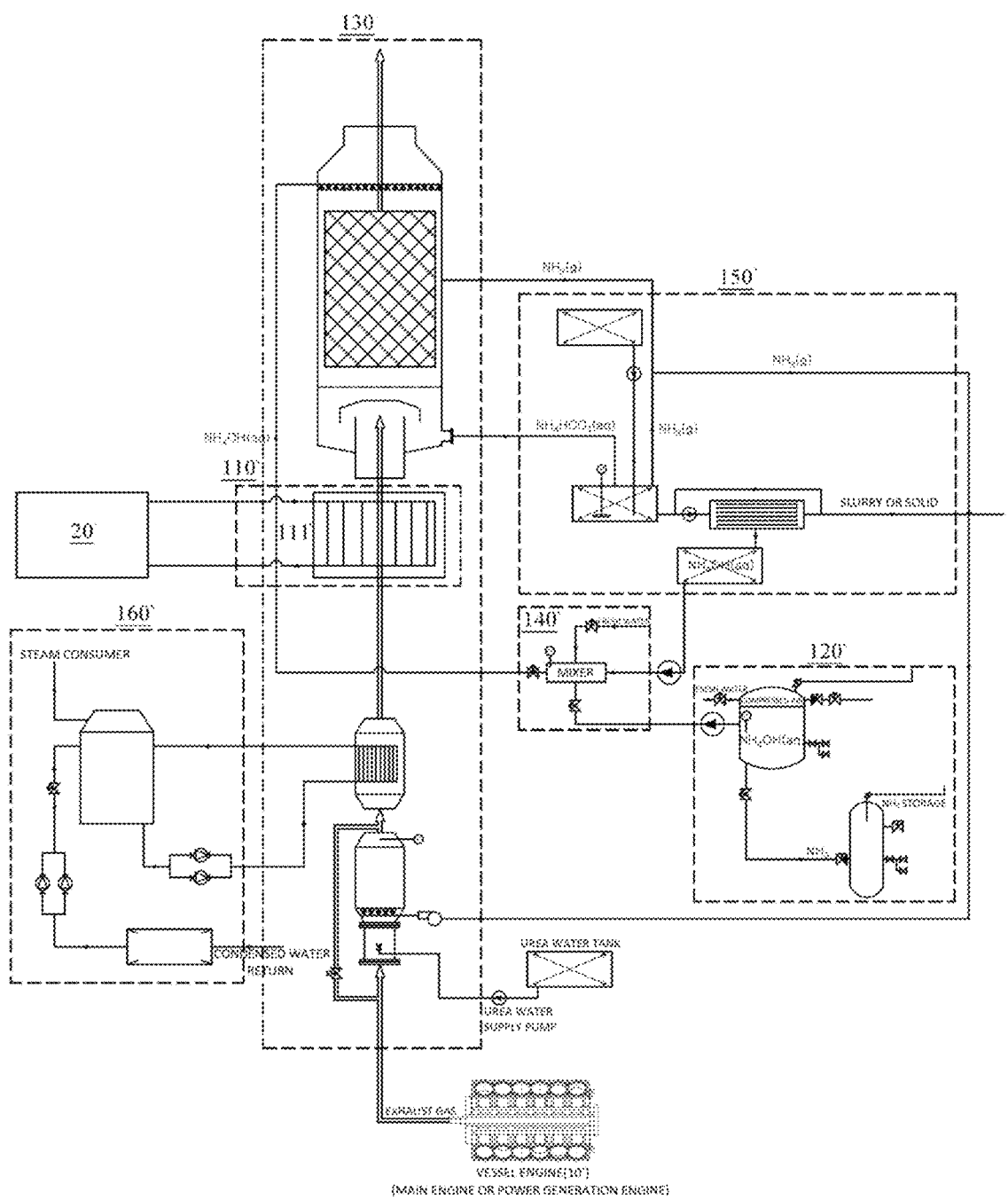
FIG. 11 is a circuit diagram of a system implementing the apparatus for reducing greenhouse gas emission in a vessel according to another embodiment, illustrated in FIG. 10.
Figure 13:
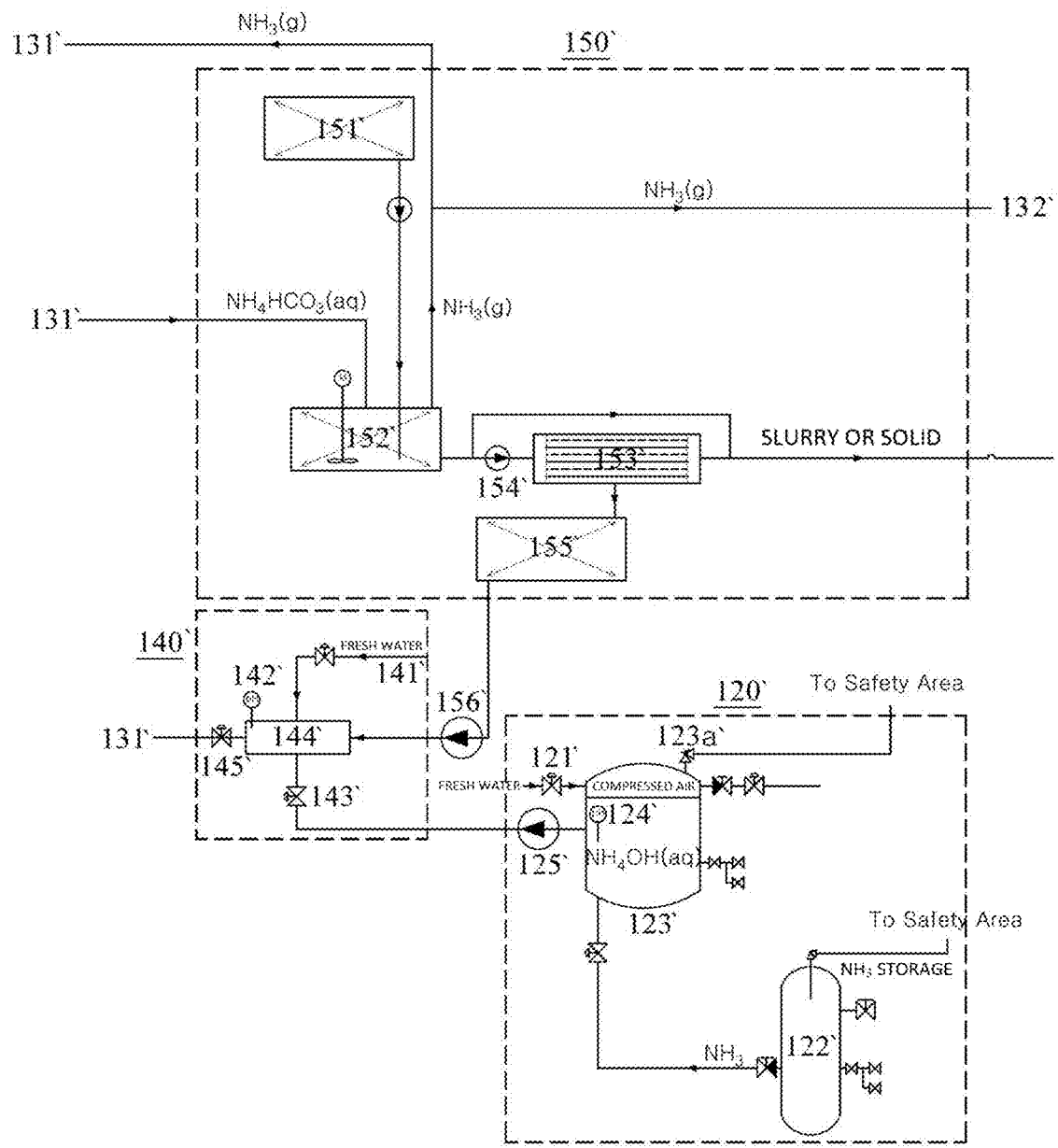
FIG. 13 separately illustrates an absorbent liquid producing unit, an absorbent liquid concentration adjusting unit, and an ammonia recycling unit of the apparatus for reducing greenhouse gas emission in a vessel according to another embodiment, illustrated in FIG. 11.

Specifically, as illustrated in FIGS. 11 and 13, the absorbent liquid producing unit 120' may include: a fresh water tank (not illustrated) that stores fresh water; a fresh water control valve 121' that supplies the fresh water from the fresh water tank to an ammonia water tank 123'; a $NH_3$ storage 122' that stores high-pressure $NH_3$; an ammonia water tank 123' that produces and stores high-concentration ammonia water by spraying $NH_3$ supplied from the $NH_3$ storage 122' to the fresh water supplied by the fresh water control valve 121'; a pH sensor 124' that measures the concentration of the ammonia water in the ammonia water tank 123'; and an ammonia water supply pump 125' that supplies the high-concentration ammonia water from the ammonia water tank 123' to the absorbent liquid concentration adjusting unit 140'.

For example, the concentration of the ammonia water circulating through the absorption tower 130' and the ammonia recycling unit 150' changes as the operation is repeated. When the concentration of the ammonia water is reduced, the high-concentration ammonia water may be supplied to an ammonia water circulation line (see A' in FIG. 10) to compensate for the reduced concentration of the ammonia water so that the ammonia water is constantly maintained at a designed concentration.

On the other hand, since the high-concentration ammonia water has a higher partial pressure of $NH_3(g)$ than that of the low-concentration ammonia water at the same temperature, $NH_3$ is relatively more evaporated in an atmospheric pressure state, resulting in an increase in loss. Therefore, in order to store the high-concentration ammonia water, it is necessary to lower temperature in order for increasing the solubility and reducing the vapor pressure of $NH_3(g)$ and to operate under the pressurization system.

That is, in order to prevent a phenomenon that $NH_3(g)$ is evaporated and lost to the atmosphere, compressed air of a certain pressure may be injected into the ammonia water tank 123' so that the pressure in the ammonia water tank 123' is maintained to be high, thereby preventing the evaporation loss of $NH_3$.

For example, since $NH_3$ may be stored in a liquid state at $-34°$ C. and 8.5 bar, 50% concentration of ammonia water may be stored in the ammonia water tank 123' by maintaining the inside of the ammonia water tank 123' at a constant pressure by using compressed air of 7 bar available in the vessel.

In addition, a safety valve 123a' for reducing the pressure by exhausting air to a safety area so as to prevent overpressure of the ammonia water tank 123' may be installed.

Next, the absorption tower 130' includes a $CO_2$ removing unit 131' that removes $CO_2$ by reacting the exhaust gas cooled by the exhaust gas cooling unit 110' with the ammonia water ($NH_4OH(aq)$), which is the absorbent liquid from the absorbent liquid producing unit 120', to convert $CO_2$ into an aqueous ammonium salt solution ($NH_4HCO_3(aq)$) as shown in [Chemical Formula 6] below.

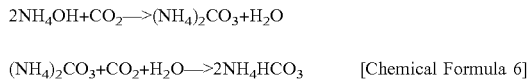

[Chemical Formula 6]

Figure 12:
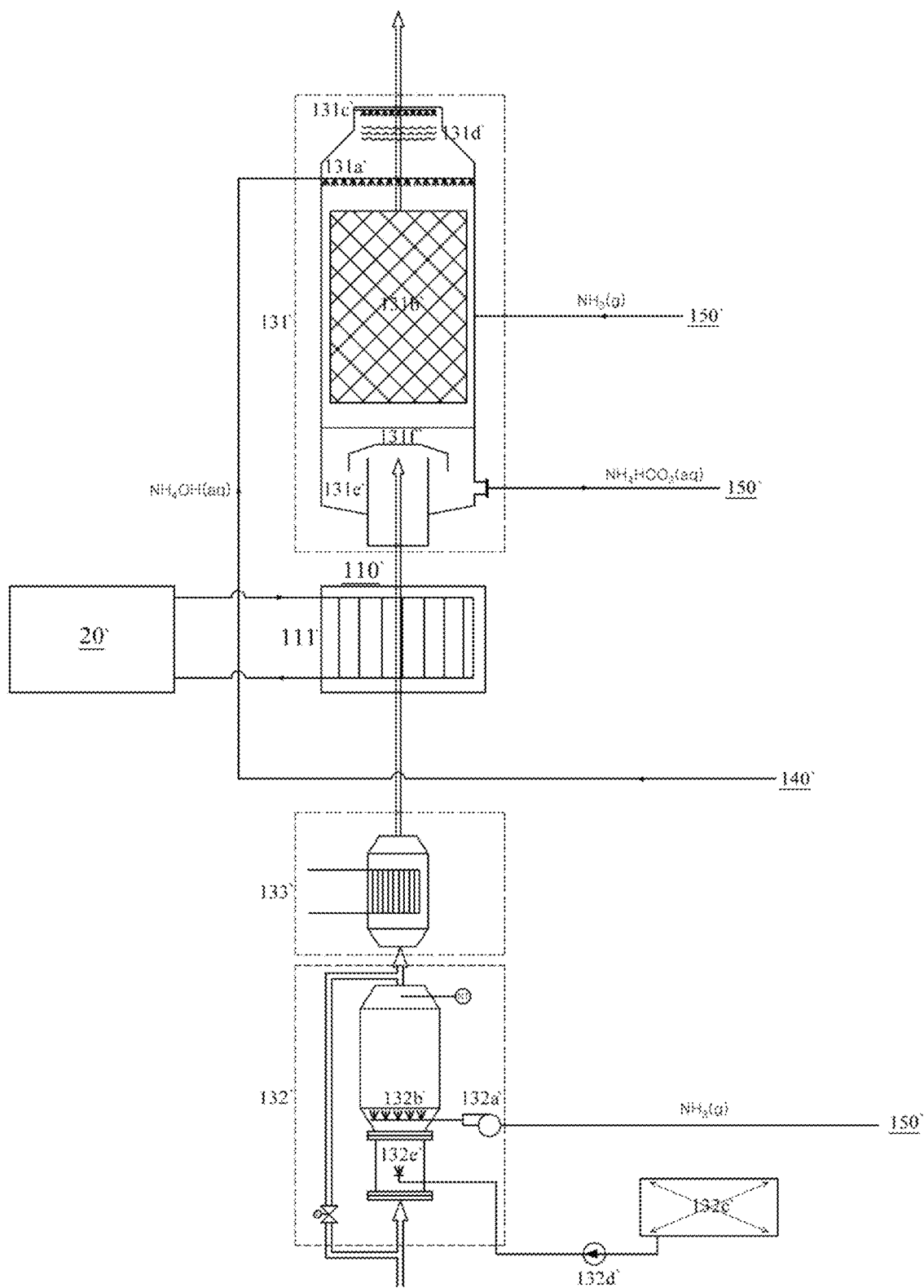
FIG. 12 separately illustrates an exhaust gas cooling unit and an absorption tower of the apparatus for reducing greenhouse gas emission in a vessel according to another embodiment, illustrated in FIG. 11.

Specifically, as illustrated in FIG. 12, the $CO_2$ removing unit 131' may include: an ammonia water spray nozzle 131a' that sprays the ammonia water supplied from the absorbent liquid concentration adjusting unit 140' downward; a packing material 131b' that contacts $CO_2$ of the exhaust gas with the ammonia water, which is the absorbent liquid, to convert $CO_2$ into $NH_4HCO_3(aq)$, which is the aqueous ammonium salt solution; a cooling jacket (not illustrated) that is formed in multi-stages for each section of the absorption apparatus filled with the packing material 131b' and cools heat generated by a $CO_2$ absorption reaction; a water spray 131c' that collects $NH_3$ discharged to the outside without reacting with $CO_2$; a mist removal plate 131d' that is formed in a curved multi-plate shape and returns the ammonia water scattered when sprayed by the ammonia water spray nozzle 131a' toward the packing material 131b'; a partition wall 131e' formed so that the ammonia water passing through the packing material 131b' does not flow back to the $SO_x$ absorbing unit 132'; and an umbrella-shaped blocking plate 131f' that covers an exhaust gas inlet hole surrounded by the partition wall 131e'.

Here, the cooling jacket may cool heat to 30° C. to 50° C. at which the material shear is smoothest, so that $NH_3$ is not evaporated and lost while maintaining a $CO_2$ absorption rate at a certain level.

Figure 15:
FIG. 15 illustrates various packing materials applied to the apparatus for reducing greenhouse gas emission in a vessel according to another embodiment, illustrated in FIG. 11.
Figure 16:
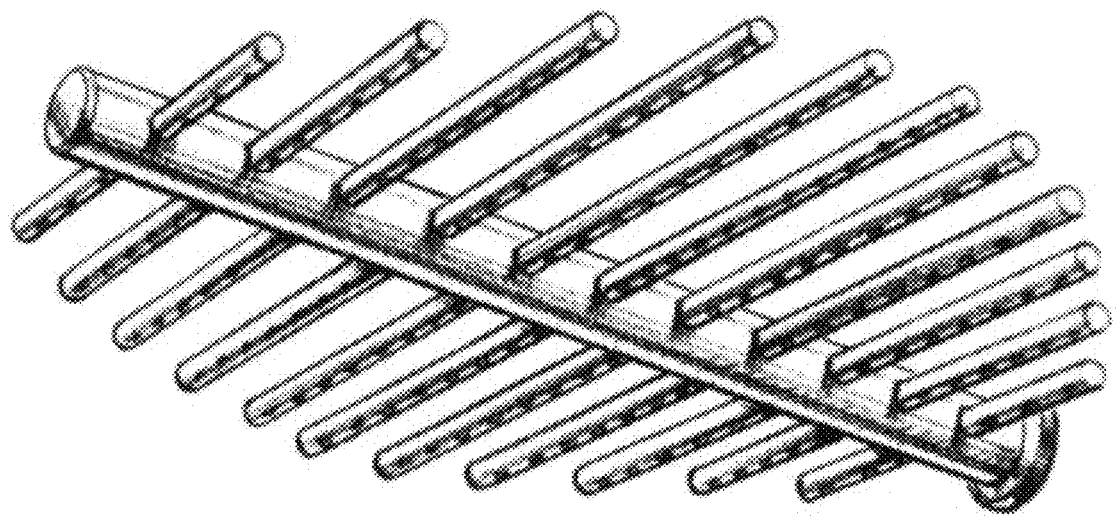
FIG. 16 illustrates an ammonia water spray nozzle applied to the apparatus for reducing greenhouse gas emission in a vessel according to another embodiment, illustrated in FIG. 11.
Figure 16:
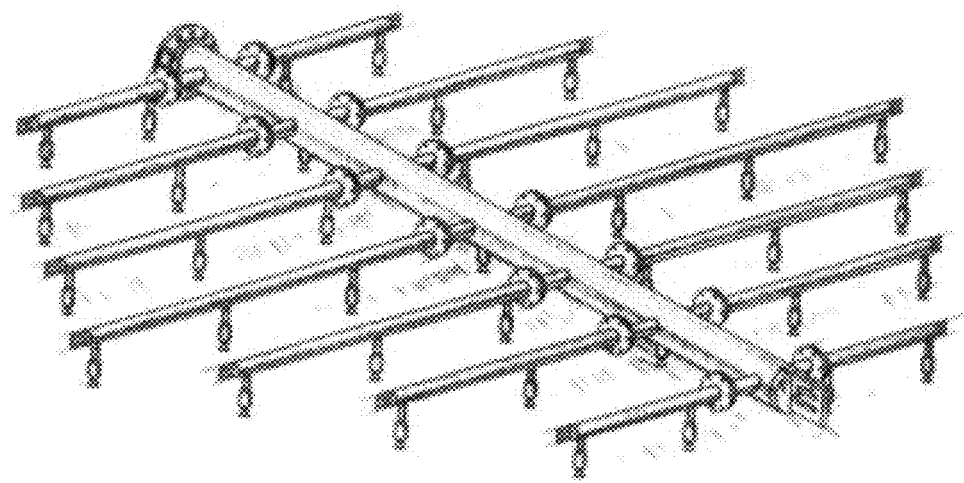

On the other hand, the $CO_2$ removing unit 131' may be considered in various forms so as to operate within an allowable pressure drop of an exhaust pipe required by an engine specification while increasing a contact area between the exhaust gas and $NH_3$. For example, the packing material 131b' may include multi-stage distilling column packings designed to increase a contact area per unit volume. As illustrated in FIG. 15, a distilling column packing suitable for an absorption process may be selected considering the contact area per unit area, the pressure drop of gas, and the flooding velocity. As illustrated in FIG. 16, the ammonia water spray nozzle 131a' may be provided in a ladder pipe form FIG. 16A or a spray form FIG. 16B.

In addition, a solution redistributor (not illustrated) may be formed between the distilling column packings so as to prevent channeling when the ammonia water passes downward through the packing material 131b', the exhaust gas passes upward through the packing material 131b', and the ammonia water and the exhaust gas contact each other.

In addition, the mist removal plate 131d' allows the scattered ammonia water to adhere to the curved multi-plate, so that droplets become large, and drains the ammonia water toward the packing material 131b' by the own weight thereof.

On the other hand, as described above, the vessel engine 10' is based on the premise of using LNG or LSMGO as fuel. When the vessel engine 10' uses LNG as fuel, $SO_x$ may not be generated, but when the vessel engine 10' uses LSMGO as fuel, the absorption tower 130' may include the $SO_x$ absorbing unit.

For example, although not separately illustrated, the $SO_x$ absorbing unit may dissolve and remove $SO_x$ while cooling the exhaust gas discharged from the vessel engine 10' through reaction with the seawater, and the $CO_2$ removing unit 131' may absorb and remove $CO_2$ by reacting the cooled exhaust gas, from which $SO_x$ is removed, with the absorbent liquid supplied from the absorbent liquid producing unit 120' to convert $CO_2$ into an aqueous ammonium salt solution.

In addition, as described above, the absorption tower 130' may further include a $NO_x$ absorbing unit 132' that absorbs and removes $NO_x$ from the exhaust gas discharged from the vessel engine 10'. The exhaust gas from which $NO_x$ has been removed may be cooled by the exhaust gas cooling unit 110', and $CO_2$ may be removed by reacting the cooled exhaust gas with the absorbent liquid supplied from the absorbent liquid producing unit 120' to convert $CO_2$ into an aqueous ammonium salt solution.

That is, in the absorption tower 130', the $NO_x$ absorbing unit 132' that absorbs and removes $NO_x$ from the exhaust gas discharged from the vessel engine 10', and the $CO_2$ removing unit 131' that removes $CO_2$ by reacting the cooled exhaust gas, from which $NO_x$ has been removed, with the ammonia water supplied from the absorbent liquid producing unit 120' to convert $CO_2$ into $NH_4HCO_3(aq)$ are stacked in the vertical direction to sequentially absorb and remove the $NO_x$ and the $CO_2$.

Therefore, since the $CO_2$ removing unit 131' removes $CO_2$ by reacting the ammonia water with the exhaust gas from which $NO_x$ has been removed, side reactions caused by $NO_x$ do not occur during the $CO_2$ removal process, thereby minimizing the generation of impurities and obtaining $NH_4HCO_3(aq)$ with less impurities in a subsequent process.

Here, the absorption tower 130' may include the $CO_2$ removing unit 131', the $NO_x$ absorbing unit 132', and an EGE 133' to be described later, may be modularized and combined with individual modules, and may be integrated in a single tower form, and the absorption tower 130' itself may include a single tower or a group of a plurality of towers.

Specifically, the $NO_x$ absorbing unit 132' is an SCR. As illustrated in FIG. 12, the $NO_x$ absorbing unit 132' may absorb $NO_x$ by directly supplying recycled $NH_3$ from the ammonia recycling unit 150' to a first $NH_3$ spray nozzle 132b' through a blower 132a' or a compressor, or when $NH_3$ is insufficient, may receive urea water of a urea water storage tank 132c' from a second $NH_3$ spray nozzle 132e' through a urea water supply pump 132d' so as to compensate for the loss or lack of $NH_3$.

On the other hand, since $NH_3$ and $CO_2$ are generated when the urea water is decomposed, it may be preferable that $NH_3$ is directly supplied to reduce the amount of $CO_2$ generated.

In addition, the absorption tower 130' may further include an EGE 133' that is formed between the $NO_x$ absorbing unit 132' and the exhaust gas cooling unit 110' and performs heat exchange between waste heat of the vessel engine 10' and boiler water.

Next, the absorbent liquid concentration adjusting unit 140' adjusts the concentration of the circulating absorbent liquid that is supplied from the absorbent liquid producing unit 120' to the absorption tower 130' and circulates through the absorbent liquid circulation line A'.

For example, when the concentration of the ammonia water circulating through the absorbent liquid circulation line A' is low, the amount of $(NH_4)_2CO_3$ produced in [Chemical Formula 6] decreases, resulting in an increase in the amount of $CO_2$ emitted. When the concentration of the ammonia water is high, the amount of $CaCO_3$ or $MgCO_3$ produced increases more than necessary due to excessive $CO_2$ absorption. Thus, the absorbent liquid concentration adjusting unit 140' has to constantly maintain the concentration of the ammonia water so that the $CO_2$ absorption performance of the absorption tower 130' is kept.

In order to achieve this purpose, the absorbent liquid concentration adjusting unit 140' may be designed to adjust the concentration of the ammonia water to 12% by mass by mixing the high-concentration ammonia water of the absorbent liquid producing unit 120' with the low-concentration ammonia water circulating through the absorbent liquid circulation line A', but the absorbent liquid concentration adjusting unit 140' is not limited thereto and may be changed according to the conditions of use.

That is, as illustrated in FIG. 13, the absorbent liquid concentration adjusting unit 140' may include: a fresh water supply line 141' that supplies fresh water; a pH sensor 142' that measures the concentration of ammonia water which is the absorbent liquid supplied to the absorption tower 130'; a flow rate control valve 143' that controls a flow rate of high-concentration ammonia water supplied from the absorbent liquid producing unit 120' by the operation of the ammonia water supply pump 125'; a mixer 144' that adjusts the concentration of the ammonia water by increasing the concentration by mixing the high-concentration ammonia water from the absorbent liquid producing unit 120' or reducing the concentration by mixing the fresh water from the fresh water supply line 141' according to the concentration of the ammonia water measured by the pH sensor 142'; and a pressure maintenance valve 145' that prevents evaporation of $NH_3$ when the mixer 144' performs the mixing.

Here, the mixer 144' may be formed in various forms as a pipe or a structure provided with blades capable of causing a vortex of fluid in order for smooth mixing, and the pressure maintenance valve 145' may be formed at a discharge port of the mixer 144' to maintain a high pressure even during mixing, thereby preventing $NH_3(g)$ from being evaporated and disappeared from the high-concentration ammonia water.

Next, the ammonia recycling unit 150' may recycle $NH_3$ by reacting an aqueous ammonium salt solution discharged from the absorption tower 130' with an aqueous divalent metal hydroxide solution based on the following [Chemical Formula 7] and [Chemical Formula 8], may return $NH_3$ back to the absorption tower 130' for reuse as a $CO_2$ absorbent liquid, may store or discharge $CO_2$ in a carbonate form of $CaCO_3(s)$ or $MgCO_3(s)$, or may supply $NH_3$ to the $NO_x$ absorbing unit 132' so as to absorb $NO_x$ as described above.

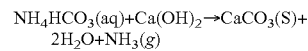   [Chemical Formula 7]

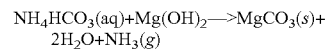   [Chemical Formula 8]

Specifically, as illustrated in FIG. 13, the ammonia recycling unit 150' may include: a storage tank 151' that stores an aqueous divalent metal hydroxide solution ($Ca(OH)_2$ or $Mg(OH)_2$); a mixing tank 152' in which the aqueous divalent metal hydroxide solution and the aqueous ammonium salt solution ($NH_4HCO_3(aq)$) discharged from the absorption tower 130' are stirred by an agitator to generate $NH_3(g)$ and carbonate; a filter 153' that suctions a solution and precipitate from the mixing tank 152' and separates carbonate; a high-pressure pump 154' that transfers the solution and precipitate to the filter 153' at high pressure; an ammonia water storage tank 155' that stores the ammonia water (or fresh water) separated by the filter 153' and supplies the ammonia water (or fresh water) to the absorbent liquid concentration adjusting unit 140'; an ammonia water circulation pump 156' that supplies the ammonia water from the ammonia water storage tank 155' to the absorbent liquid concentration adjusting unit 140'; and a separate storage tank (not illustrated) that stores carbonate ($CaCO_3(s)$ or MgCO$_3$(s)) separated by the filter 153' in a slurry form or a solid state transferred to a dryer (not illustrated) and solidified.

Here, the reaction is continuously performed by the agitator installed in the mixing tank 152', and a constant temperature may be maintained so that the reaction is smoothly performed.

In addition, in the storage tank 151', the aqueous divalent metal hydroxide solution (Ca(OH)$_2$ or Mg(OH)$_2$) is generated by reacting the fresh water with the metal oxide (CaO or MgO), is stored therein, and is supplied to the mixing tank 152'.

In this manner, since only the relatively inexpensive metal oxide (CaO or MgO) or aqueous divalent metal hydroxide solution (Ca(OH)$_2$ or Mg(OH)$_2$) is added, no additional addition of water is required, there is no decrease in the concentration of ammonia water, the capacity size of the filter 153' may be reduced, and the NH$_3$ recycling cost may be reduced. That is, in theory, only the metal oxide is consumed and NH$_3$ and fresh water are reused, thereby significantly reducing the CO$_2$ removal cost.

In addition, the filter 153' suctions the solution and precipitate from the mixing tank 152', transfers NaHCO$_3$ and other by-product precipitates at high pressure by the high-pressure pump 154', separates carbonate, and stores carbonate in a solid state or discharges carbonate to the outside of the vessel. Here, as an example of the filter 153', a membrane filter suitable for precipitate separation by high-pressure fluid transfer may be applied.

In addition, the ammonia water circulation pump 156' may be provided as a centrifugal pump type pump so that a large amount of ammonia water circulates through the absorbent liquid circulation line A'.

Figure 14:
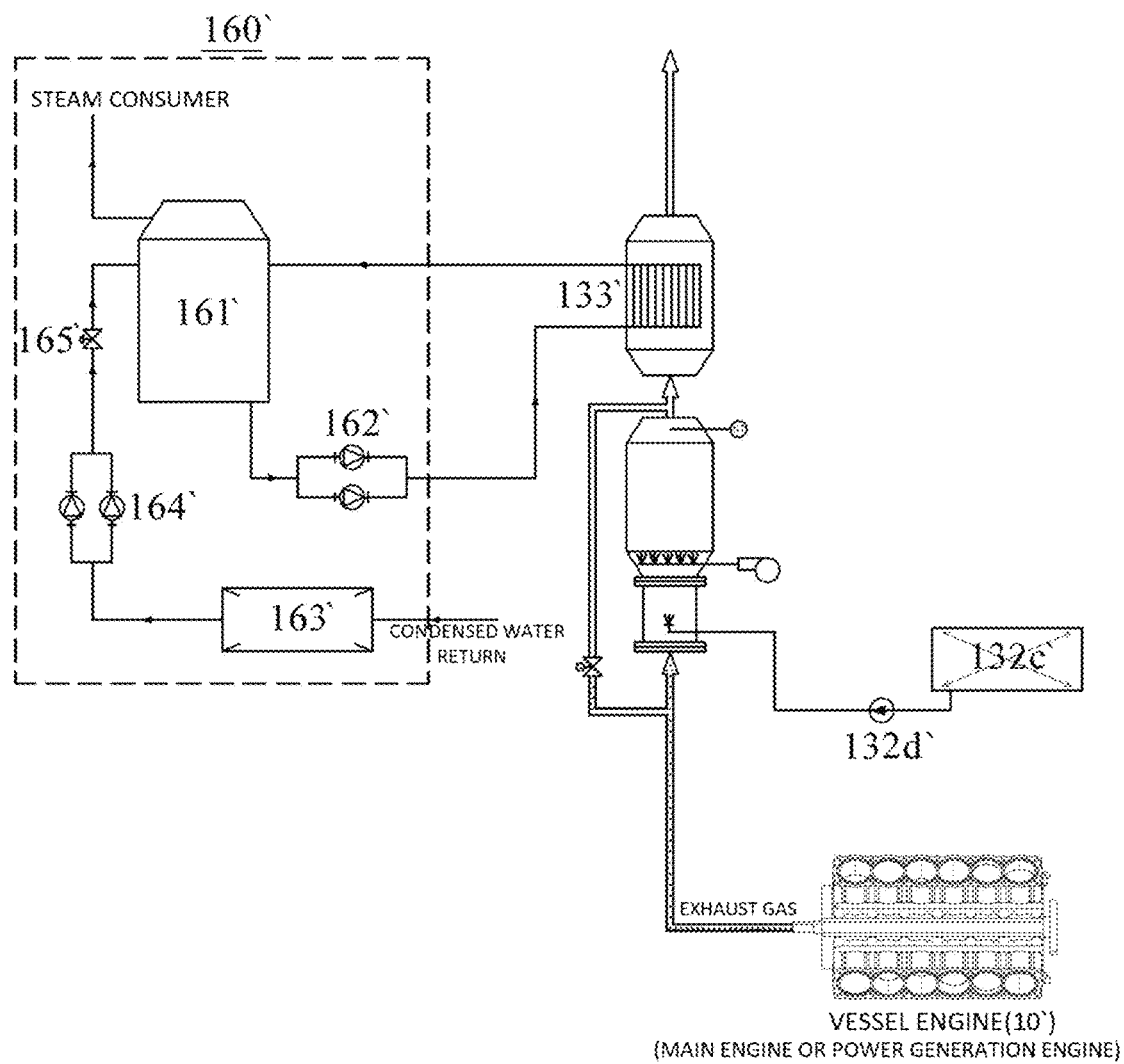
FIG. 14 separately illustrates a steam generating unit of the apparatus for reducing greenhouse gas emission in a vessel according to another embodiment, illustrated in FIG. 11.

Next, as illustrated in FIG. 14, the steam generating unit 160' may include: an auxiliary boiler 161' that receives a mixture in the form of saturated water and steam heat-exchanged through the EGE 133', separates the steam by a steam drum (not illustrated), and supplies the separated steam to a steam consumer; a boiler water circulation pump 162' that circulates and supplies boiler water from the auxiliary boiler 161' to the EGE 133'; a cascade tank 163' that recovers condensed water condensed and phase-changed after being consumed from the steam consumer; and a supply pump 164' and a control valve 165' that supply boiler water from the cascade tank 163' to the auxiliary boiler 161' while controlling the amount of boiler water. The steam generating unit 160' generates and supplies steam required for heating devices in the vessel.

Here, when the load of the vessel engine 10' is large, the amount of heat that may be provided from the exhaust gas is large, and thus the amount of steam required in the vessel may be sufficiently produced through the EGE 133'; otherwise, the auxiliary boiler 161' itself may burn fuel to produce necessary steam.

On the other hand, a discharge unit (not illustrated) that treats cleaning water discharged from the absorption tower 130' may be provided. For example, the discharge unit may include: a cleaning water tank that stores cleaning water discharged from the absorption tower 130'; a water treatment device including a filtering unit that controls turbidity to satisfy the outboard discharge condition of the cleaning water transferred from the cleaning water tank by the transfer pump, and a neutralizing agent injecting unit that controls pH; and a sludge storage tank that separates and stores solid emissions such as soot. The discharge unit may discharge the cleaning water, which passes through the water treatment device and satisfies the outboard discharge condition, to the outside of the vessel, and may separately store the solid emissions, such as soot, which do not satisfy the outboard discharge conditions, in the sludge storage tank.

On the other hand, NaOH may be used as the neutralizing agent for satisfying the outboard discharge condition. However, assuming that the materials discharged from the absorption tower 130' are acidic and basic, a neutralizing agent capable of neutralizing each of the acidic material and the basic material may be selected and used as necessary.

On the other hand, according to still another embodiment of the present invention, a vessel including the apparatus for reducing greenhouse gas emission may be provided.

In addition, the apparatus for reducing greenhouse gas emission in the vessel has the following effects. Exhaust gas may be cooled with fresh water supplied from an onboard cooling system by a heat exchange method, thereby preventing the decrease in concentration of absorbent liquid and reducing the capacity size of the rear end of the filter. The concentration of absorbent liquid may be controlled to maintain the concentration of absorbing liquid constant to prevent the decrease in greenhouse gas absorption performance. A pressurization system may be applied to prevent the loss of absorbent liquid due to the natural evaporation of high-concentration absorbent liquid. In order to satisfy the IMO greenhouse gas emission regulations, greenhouse gas may be converted into materials that do not affect environments and then separately discharged or may be converted into useful materials and then stored. Greenhouse gas may be stored in the form of carbonate that exists in a natural state so that greenhouse gas may be discharged to the sea. NH$_3$ may be recycled to minimize the consumption of relatively expensive NH$_3$.

The present invention has been described above with reference to the embodiments illustrated in the drawings. However, the present invention is not limited thereto, and various modifications or other embodiments falling within the scope equivalent to the present invention can be made by those of ordinary skill in the art. Therefore, the true scope of protection of the present invention should be determined by the appended claims.

The invention claimed is:

1. An apparatus for reducing greenhouse gas emission in a vessel, the apparatus comprising:
   a seawater supply unit that supplies seawater;
   an absorbent liquid producing unit that produces and supplies a high-concentration CO$_2$ absorbent liquid;
   an absorption tower comprising a CO$_2$ removing unit that cools exhaust gas discharged from a vessel engine by reacting the exhaust gas with the seawater supplied from the seawater supply unit and removes CO$_2$ by reacting the cooled exhaust gas with the absorbent liquid supplied from the absorbent liquid producing unit to convert CO$_2$ into an aqueous ammonium salt solution;
   an absorbent liquid concentration adjusting unit that adjusts a concentration of the absorbent liquid supplied from the absorbent liquid producing unit to the absorption tower; and
   an ammonia recycling unit that recycles NH$_3$ by reacting the aqueous ammonium salt solution discharged from the absorption tower with an aqueous divalent metal hydroxide solution and returns the NH$_3$ back to the absorption tower for reuse as the absorbent liquid.

2. The apparatus according to claim 1, wherein the vessel engine uses liquefied natural gas (LNG) or low sulphur marine gas oil (LSMGO) as fuel.

3. The apparatus according to claim 2, wherein, when the vessel engine uses the LSMGO as fuel,
the absorption tower further comprises a $SO_x$ absorbing unit that dissolves and removes $SO_x$ while cooling the exhaust gas discharged from the vessel engine by reacting the exhaust gas with the seawater supplied from the seawater supply unit, and
the $CO_2$ removing unit cools the exhaust gas, from which the $SO_x$ has been removed, by reacting the exhaust gas with the seawater supplied from the seawater supply unit and removes $CO_2$ by reacting the cooled exhaust gas with the absorbent liquid supplied from the absorbent liquid producing unit to convert $CO_2$ into the aqueous ammonium salt solution.

4. The apparatus according to claim 1, wherein the absorption tower further comprises a $NO_x$ absorbing unit that absorbs and removes $NO_x$ rom the exhaust gas emitted from the vessel engine, and
the $CO_2$ removing unit cools the exhaust gas, from which the $NO_x$ has been removed, by reacting the exhaust gas with the seawater supplied from the seawater supply unit and removes $CO_2$ by reacting the cooled exhaust gas with the absorbent liquid supplied from the absorbent liquid producing unit to convert $CO_2$ into the aqueous ammonium salt solution.

5. The apparatus according to claim 4, wherein the ammonia recycling unit recycles $NH_3$ and returns the $NH_3$ back to the absorption tower for reuse as the absorbent liquid, and
the $NO_x$ absorbing unit absorbs $NO_x$ ith the $NH_3$ pplied from the ammonia recycling unit, or absorbs $NO_x$ using urea water.

6. The apparatus according to claim 1, wherein, in the absorption tower, a $NO_x$ absorbing unit that absorbs and removes $NO_x$ rom the exhaust gas discharged from the vessel engine, a $SO_x$ absorbing unit that dissolves and removes $SO_x$ hile cooling the exhaust gas, from which the $NO_x$ has been removed, through reaction with the seawater supplied from the seawater supply unit, and the $CO_2$ removing unit that removes $CO_2$ by reacting the exhaust gas, from which the $SOX_x$ has been removed, with the absorbent liquid supplied from the absorbent liquid producing unit to convert $CO_2$ into the aqueous ammonium salt solution are sequentially stacked.

7. The apparatus according to claim 1, wherein the absorbent liquid producing unit comprises:
a fresh water tank that stores fresh water;
a fresh water control valve that supplies the fresh water from the fresh water tank;
a $NH_3$ storage that stores high-pressure $NH_3$;
an ammonia water tank that produces and stores high-concentration ammonia water by spraying the $NH_3$ supplied from the $NH_3$ torage to the fresh water supplied by the fresh water control valve;
a pH sensor that measures a concentration of the ammonia water in the ammonia water tank; and
an ammonia water supply pump that supplies the ammonia water from the ammonia water tank to the absorbent liquid concentration adjusting unit.

8. The apparatus according to claim 1, wherein the absorbent liquid concentration adjusting unit comprises:
a fresh water supply line that supplies fresh water;
a pH sensor that measures a concentration of ammonia water which is the absorbent liquid supplied to the absorption tower;

a flow rate control valve that controls a flow rate of the ammonia water supplied from the absorbent liquid producing unit;
a mixer that adjusts the concentration of the ammonia water by increasing the concentration by mixing the high-concentration ammonia water from the absorbent liquid producing unit or reducing the concentration by mixing the fresh water from the fresh water supply line according to the concentration of the ammonia water measured by the pH sensor; and
a pressure maintenance valve that prevents evaporation of $NH_3$ when the mixer performs the mixing.

9. The apparatus according to claim 1, wherein the $CO_2$ removing unit comprises:
an ammonia water spray nozzle that sprays the ammonia water supplied from the absorbent liquid concentration adjusting unit downward;
a packing material that contacts $CO_2$ with the ammonia water to convert the $CO_2$ into $NH_4HCO_3(aq)$;
a cooling jacket that is formed in multi-stages for each section of an absorption apparatus filled with the packing material and cools heat generated by a $CO_2$ absorption reaction;
a water spray that collects $NH_3$ discharged to the outside without reacting with $CO_2$;
a mist removal plate that is formed in a curved multi-plate shape and returns the ammonia water toward the packing material;
a partition wall that is formed so that the ammonia water does not flow backward; and
an umbrella-shaped blocking plate that covers an exhaust gas inlet hole surrounded by the partition wall.

10. The apparatus according to claim 1, wherein the ammonia recycling unit comprises:
a storage tank that stores the aqueous divalent metal hydroxide solution;
a mixing tank in which the aqueous divalent metal hydroxide solution and the aqueous ammonium salt solution discharged from the absorption tower are stirred by an agitator to generate $NH_3(g)$ and carbonate;
a filter that suctions a solution and precipitate from the mixing tank and separates carbonate;
a high-pressure pump that transfers the solution and precipitate to the filter at high pressure; and
an ammonia water storage tank that stores ammonia water or fresh water separated by the filter and supplies the ammonia water or the fresh water to the absorbent liquid concentration adjusting unit.

11. An apparatus for reducing greenhouse gas emission in a vessel, the apparatus comprising:
an exhaust gas cooling unit that cools exhaust gas discharged from a vessel engine;
an absorbent liquid producing unit that produces and supplies a high-concentration $CO_2$ absorbent liquid;
an absorption tower comprising a $CO_2$ removing unit that removes $CO_2$ by reacting the exhaust gas cooled by the exhaust gas cooling unit with the absorbent liquid supplied from the absorbent liquid producing unit to convert $CO_2$ into an aqueous ammonium salt solution;
an absorbent liquid concentration adjusting unit that adjusts a concentration of the absorbent liquid supplied from the absorbent liquid producing unit to the absorption tower; and
an ammonia recycling unit that recycles $NH_3$ by reacting the aqueous ammonium salt solution discharged from the absorption tower with an aqueous divalent metal hydroxide solution and returns the $NH_3$ back to the absorption tower for reuse as the absorbent liquid.

12. The apparatus according to claim 11, wherein the vessel engine uses liquefied natural gas (LNG) or low sulphur marine gas oil (LSMGO) as fuel.

13. The apparatus according to claim 11, wherein the exhaust gas cooling unit cools the exhaust gas to a temperature of 27° C. to 33° C. by circulating fresh water supplied from an onboard cooling system through a heat exchange pipe surrounding an exhaust gas discharge pipe.

14. The apparatus according to claim 11, wherein the absorption tower further comprises a $NO_x$ absorbing unit that absorbs and removes $NO_x$ the exhaust gas emitted from the vessel engine, and
the $CO_2$ removing unit removes $CO_2$ by reacting the exhaust gas, from which the $NO_x$ has been removed and which is cooled by the exhaust gas cooling unit, with the absorbent liquid supplied from the absorbent liquid producing unit to convert $CO_2$ into the aqueous ammonium salt solution.

15. The apparatus according to claim 14, wherein the ammonia recycling unit recycles $NH_3$ and returns the $NH_3$ back to the absorption tower for reuse as the absorbent liquid, and
the $NO_x$ absorbing unit absorbs $NH_3$ supplied from the ammonia recycling unit, or absorbs $NO_x$ using urea water.

16. The apparatus according to claim 11, wherein the absorbent liquid producing unit comprises:
a fresh water tank that stores fresh water;
a fresh water control valve that supplies the fresh water from the fresh water tank;
a $NH_3$ storage that stores high-pressure $NH_3$;
an ammonia water tank that produces and stores high-concentration ammonia water by spraying the $NH_3$ supplied from the $NH_3$ torage to the fresh water supplied by the fresh water control valve;
a pH sensor that measures a concentration of the ammonia water in the ammonia water tank; and
an ammonia water supply pump that supplies the ammonia water from the ammonia water tank to the absorbent liquid concentration adjusting unit.

17. The apparatus according to claim 16, wherein compressed air of a certain pressure is injected into the ammonia water tank to prevent evaporation loss of $NH_3$.

18. The apparatus according to claim 11, wherein the absorbent liquid concentration adjusting unit comprises:
a fresh water supply line that supplies fresh water;
a pH sensor that measures a concentration of ammonia water which is the absorbent liquid supplied to the absorption tower;
a flow rate control valve that controls a flow rate of the ammonia water supplied from the absorbent liquid producing unit;
a mixer that adjusts the concentration of the ammonia water by increasing the concentration by mixing the high-concentration ammonia water from the absorbent liquid producing unit or reducing the concentration by mixing the fresh water from the fresh water supply line according to the concentration of the ammonia water measured by the pH sensor; and
a pressure maintenance valve that prevents evaporation of $NH_3$ when the mixer performs the mixing.

19. The apparatus according to claim 11, wherein the $CO_2$ removing unit comprises:
an ammonia water spray nozzle that sprays the ammonia water supplied from the absorbent liquid concentration adjusting unit downward;
a packing material that contacts $CO_2$ with the ammonia water to convert the $CO_2$ into $NH_4HCO_3(aq)$;
a cooling jacket that is formed in multi-stages for each section of an absorption apparatus filled with the packing material and cools heat generated by a $CO_2$ absorption reaction;
a water spray that collects $NH_3$ discharged to the outside without reacting with $CO_2$;
a mist removal plate that is formed in a curved multi-plate shape and returns the ammonia water toward the packing material;
a partition wall that is formed so that the ammonia water does not flow backward; and
an umbrella-shaped blocking plate that covers an exhaust gas inlet hole surrounded by the partition wall.

20. The apparatus according to claim 11, wherein the ammonia recycling unit comprises:
a storage tank that stores the aqueous divalent metal hydroxide solution;
a mixing tank in which the aqueous divalent metal hydroxide solution and the aqueous ammonium salt solution discharged from the absorption tower are stirred by an agitator to generate $NH_3(g)$ and carbonate;
a filter that suctions a solution and precipitate from the mixing tank and separates carbonate;
a high-pressure pump that transfers the solution and precipitate to the filter at high pressure; and
an ammonia water storage tank that stores ammonia water or fresh water separated by the filter and supplies the ammonia water or the fresh water to the absorbent liquid concentration adjusting unit.

* * * * *